United States Patent
Min et al.

(10) Patent No.: US 8,128,884 B2
(45) Date of Patent: Mar. 6, 2012

(54) PLASMA REACTOR

(75) Inventors: Hung Sik Min, Daegu (KR); Young Geun An, Daegu (KR); Sung Jin Yang, Daegu (KR)

(73) Assignee: CMTech Co., Ltd. (KR)

( * ) Notice: Subject to any disclaimer, the term of this patent is extended or adjusted under 35 U.S.C. 154(b) by 382 days.

(21) Appl. No.: 12/376,471

(22) PCT Filed: Aug. 10, 2007

(86) PCT No.: PCT/KR2007/003842
§ 371 (c)(1),
(2), (4) Date: Feb. 5, 2009

(87) PCT Pub. No.: WO2008/032934
PCT Pub. Date: Mar. 20, 2008

(65) Prior Publication Data
US 2010/0192542 A1    Aug. 5, 2010

(30) Foreign Application Priority Data

Sep. 14, 2006    (KR) ................... 10-2006-0089186

(51) Int. Cl.
  *B01J 19/08* (2006.01)
  *B01J 19/12* (2006.01)
  *F01N 3/00* (2006.01)
(52) U.S. Cl. .............. 422/186.04; 422/186; 60/275
(58) Field of Classification Search ........... 422/186.04; 60/275
See application file for complete search history.

(56) References Cited

U.S. PATENT DOCUMENTS

| | | | | |
|---|---|---|---|---|
| 2,403,241 A | * | 7/1946 | Schaefer | 422/186.07 |
| 5,205,990 A | * | 4/1993 | Lawless | 422/121 |
| 6,464,945 B1 | * | 10/2002 | Hemingway | 422/174 |
| 6,821,493 B2 | * | 11/2004 | Nelson et al. | 422/186.04 |
| 6,979,892 B2 | * | 12/2005 | Li et al. | 257/682 |
| 7,497,889 B2 | * | 3/2009 | Furukawa et al. | 60/275 |
| 2006/0138957 A1 | * | 6/2006 | Fujioka et al. | 313/586 |
| 2006/0152133 A1 | * | 7/2006 | Miyairi | 313/495 |
| 2007/0053805 A1 | * | 3/2007 | Kaneko et al. | 422/186.04 |
| 2010/0068104 A1 | * | 3/2010 | Kim | 422/117 |

* cited by examiner

*Primary Examiner* — Jill Warden
*Assistant Examiner* — Charles D Hammond
(74) *Attorney, Agent, or Firm* — Park & Associates IP Law, P.C.

(57) ABSTRACT

A plasma reactor has high durability with performance to generate stable and uniform plasma. The reactor has a variety of advantages such as increasing the range of commercial applications since the reactor has a structure that allows simple and efficient installation and operation in a system at a position required by the system. The reactor includes a stack constructed by sequentially stacking plus and minus electrodes and spacers and a reactor body provided at one side of the stack to hold the stack. The plus and minus electrodes are arranged alternately with spacers to define passages through which gas is allowed to pass. Each of the plus and minus electrodes has deformation preventing means to disperse stress of the electrodes and to prevent a local thermal stress caused by thermal expansion and contraction, thereby increasing thermal shock-resistant performance. External terminals for connection to the plus and minus electrodes are provided on the reactor body. A projection is formed on a surface of the reactor body in a direction perpendicular to a stack direction of the stack to allow the reactor to be easily fixed to a case.

22 Claims, 21 Drawing Sheets

[Fig. 1]
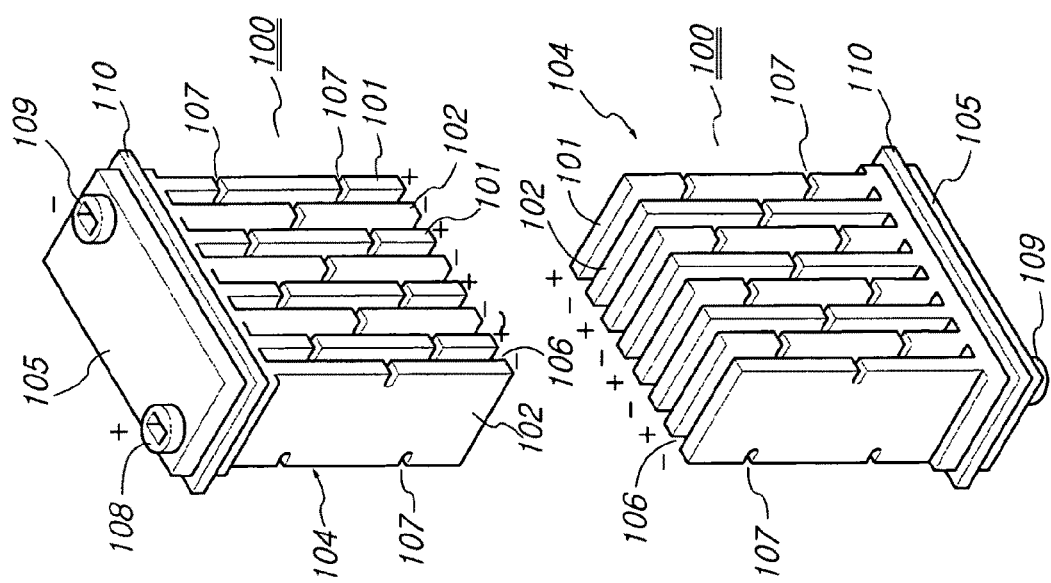

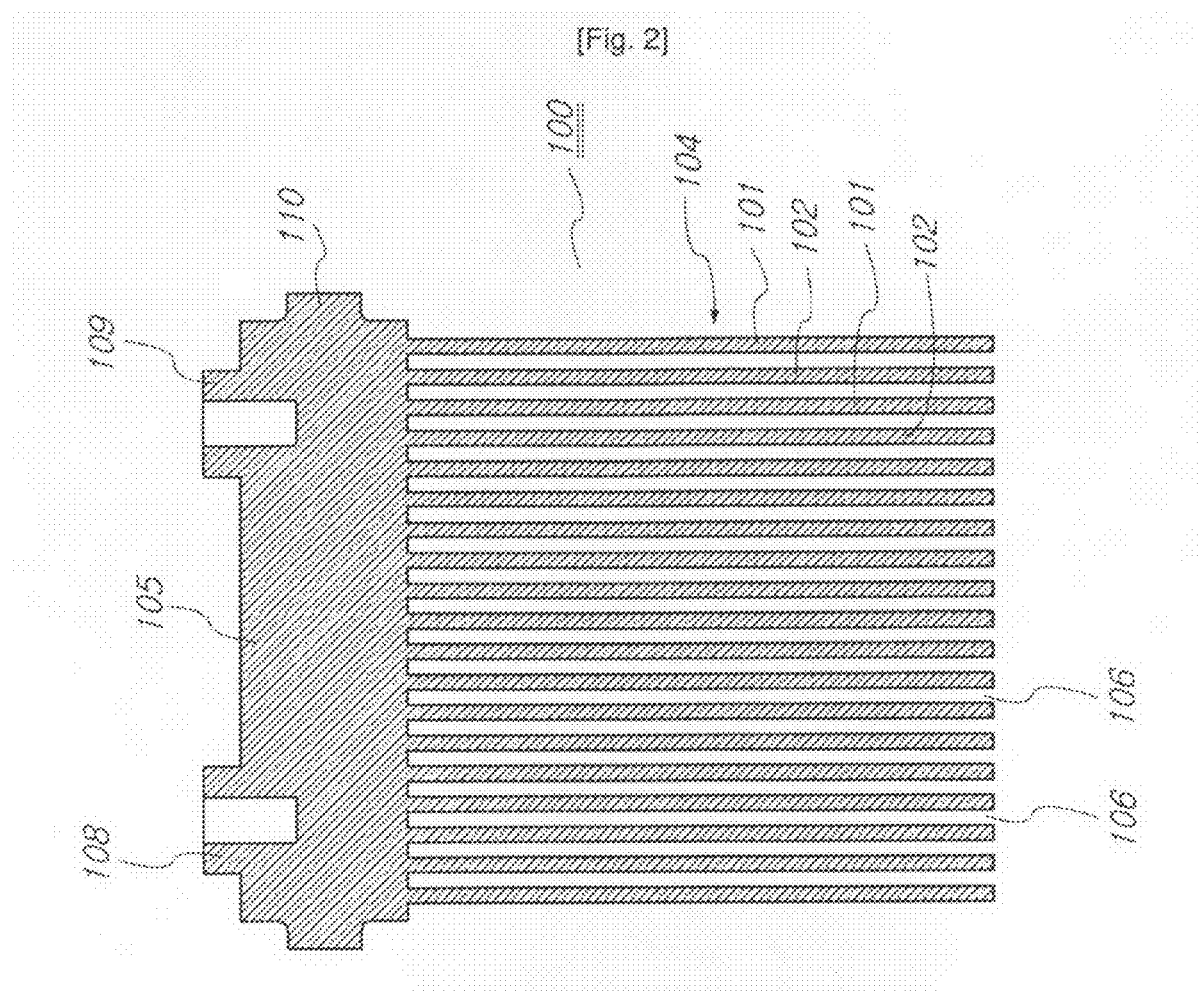

[Fig. 3]
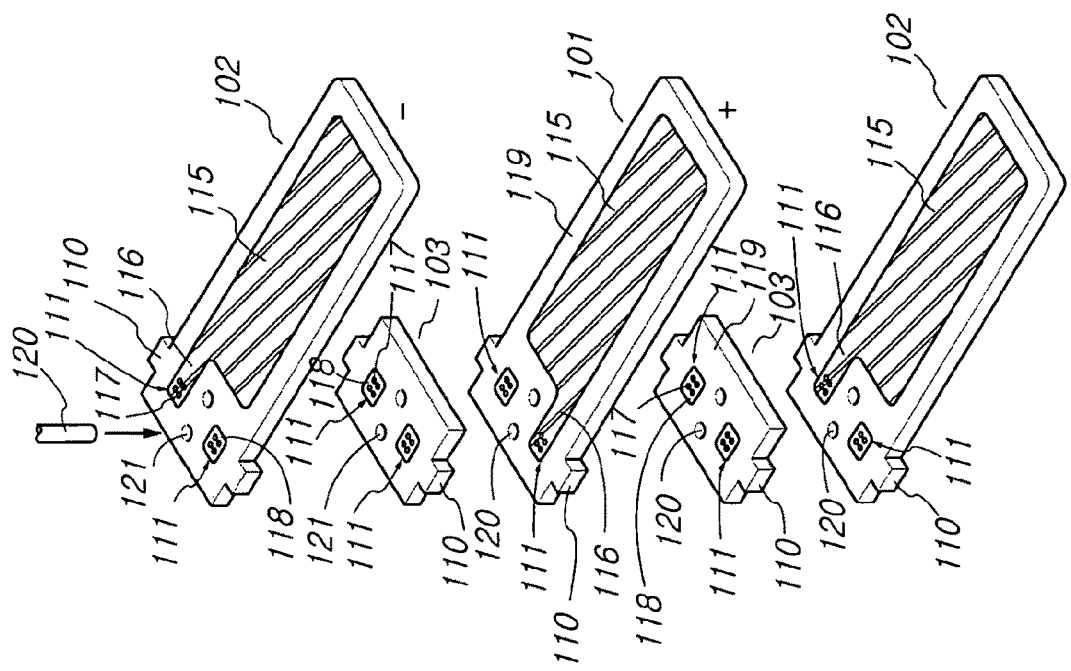

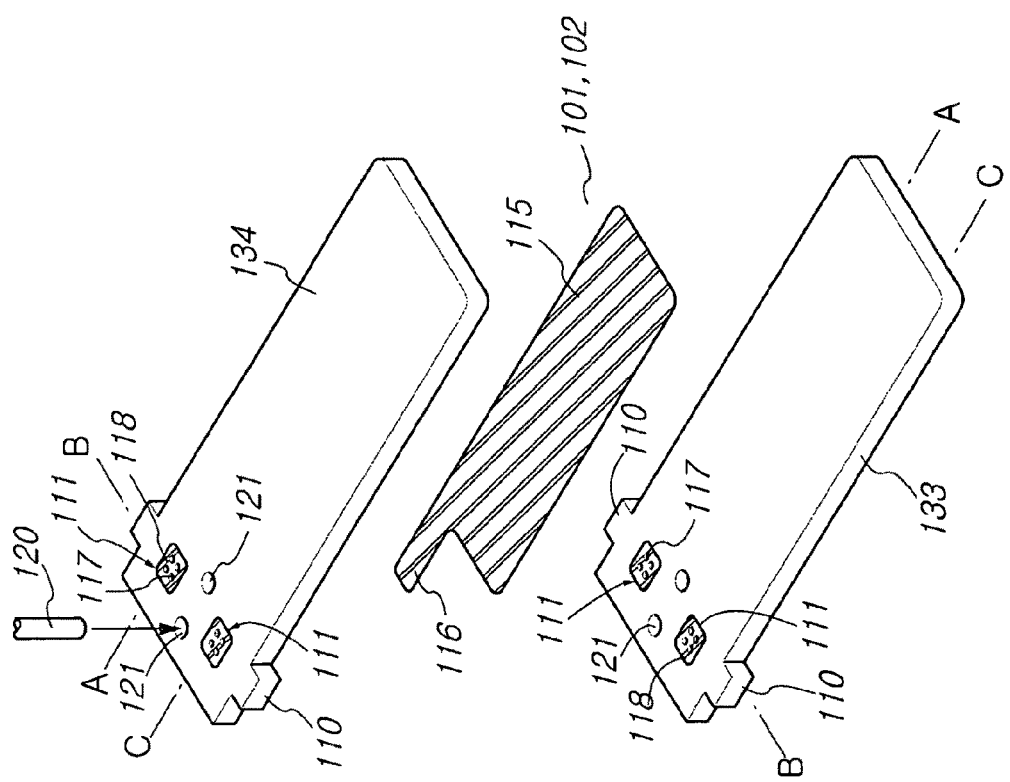
[Fig. 4]

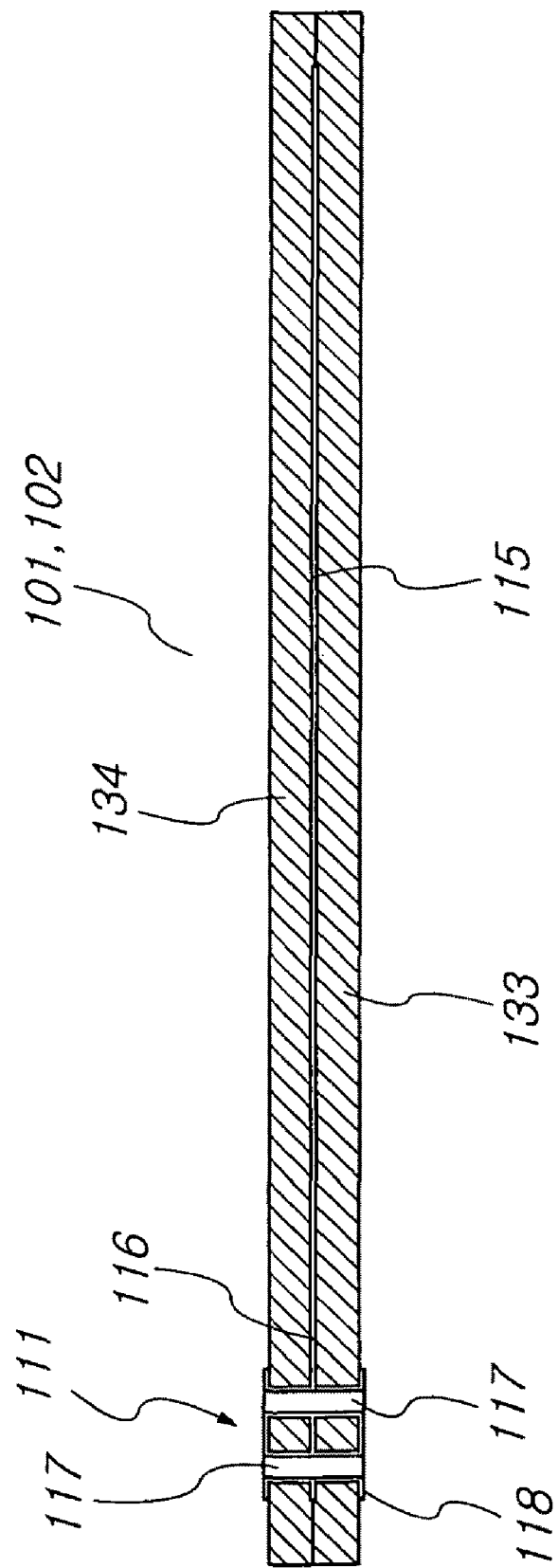
[Fig. 5]

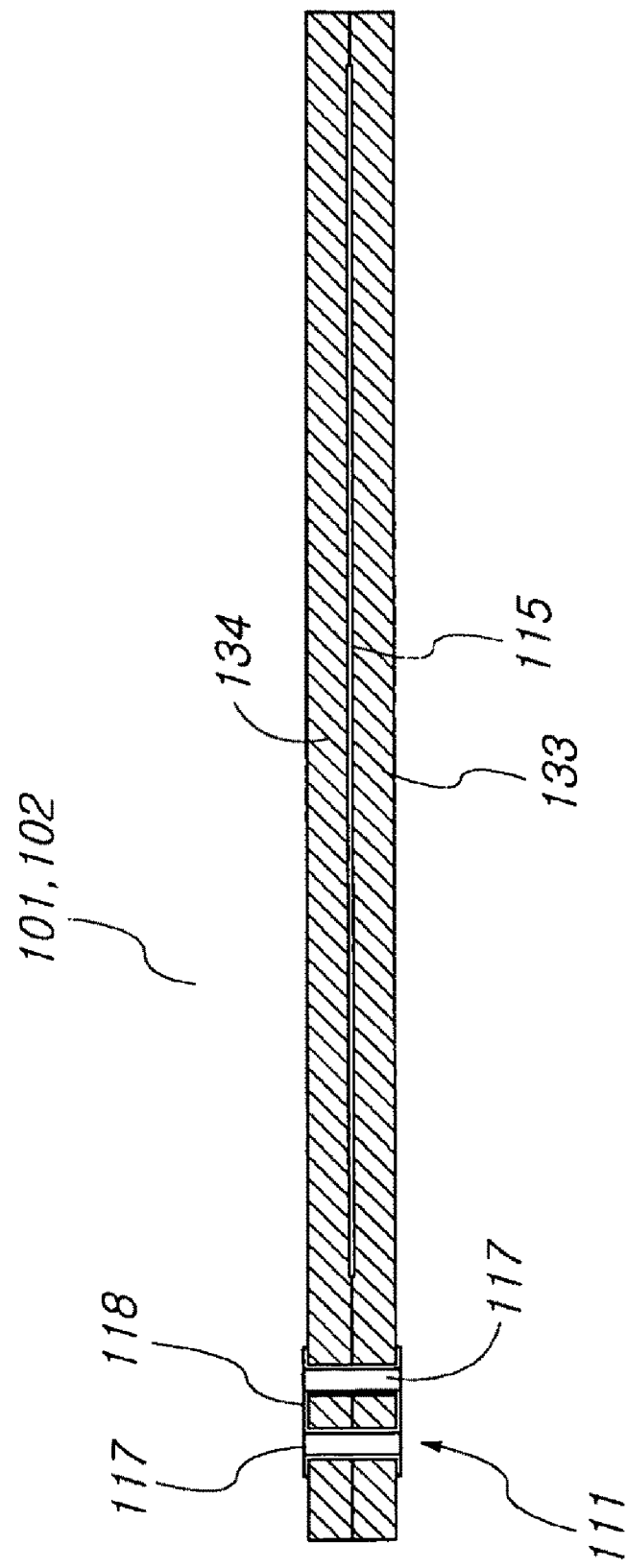
[Fig. 6]

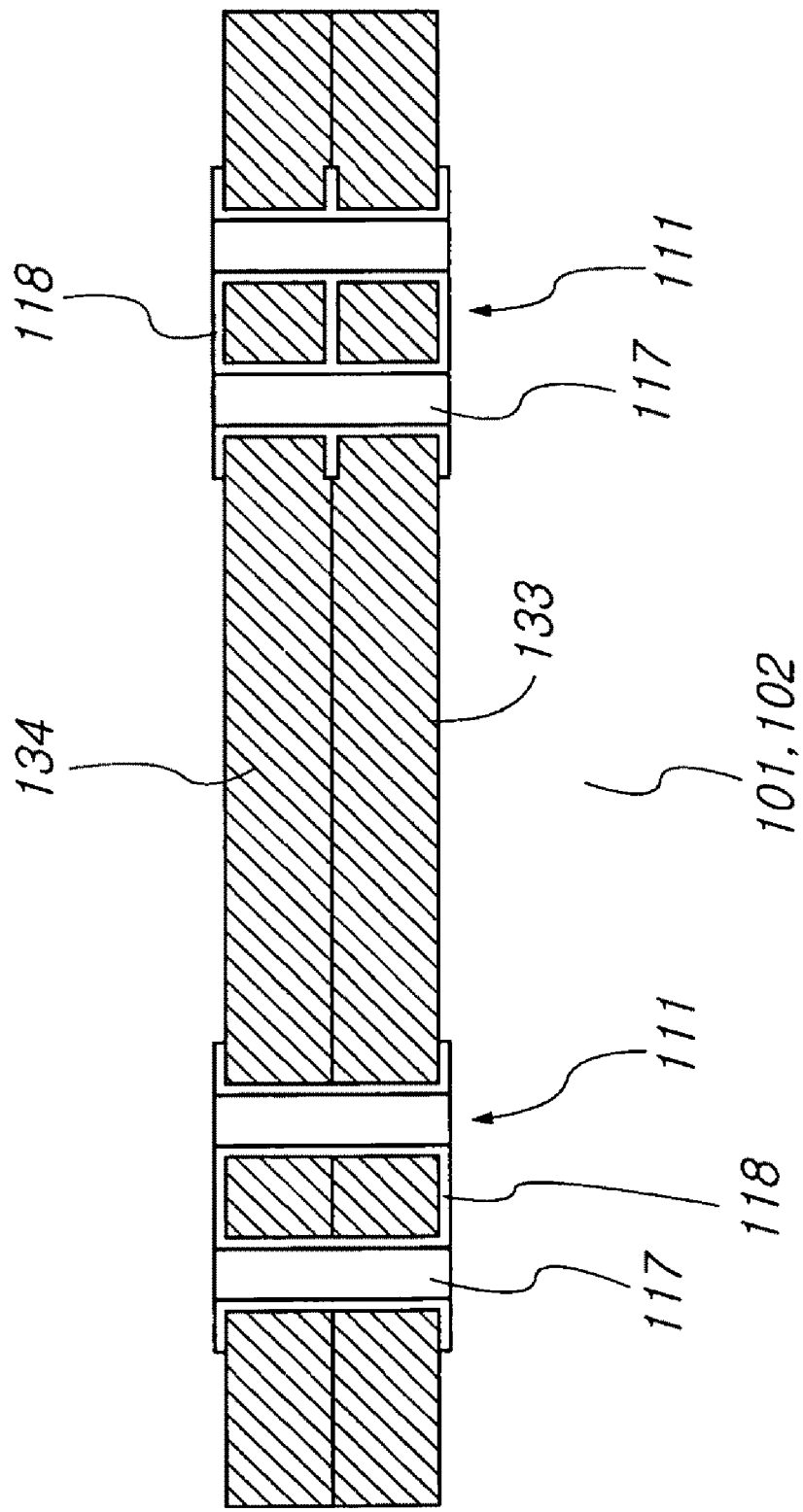
[Fig. 7]

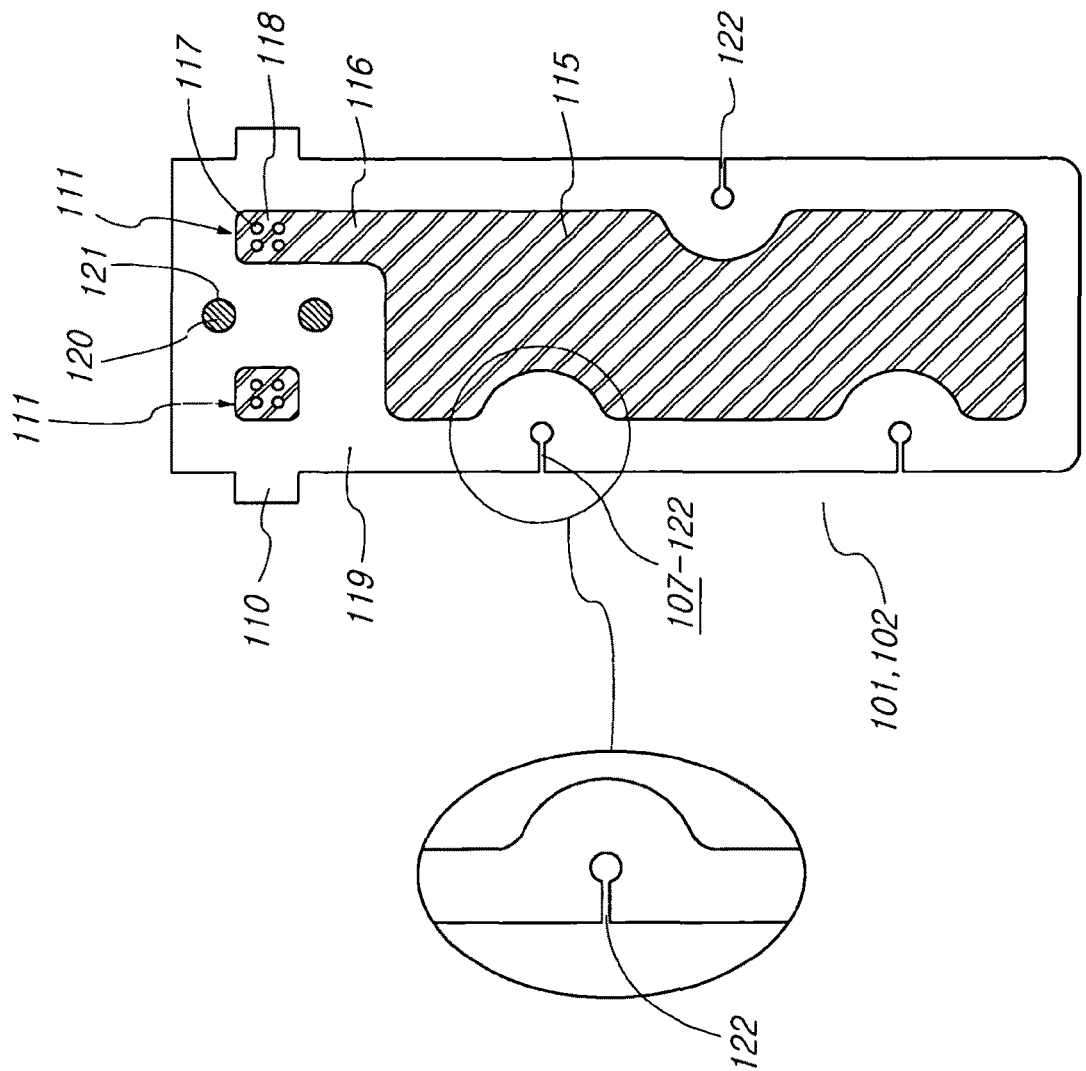
[Fig. 8]

[Fig. 9]
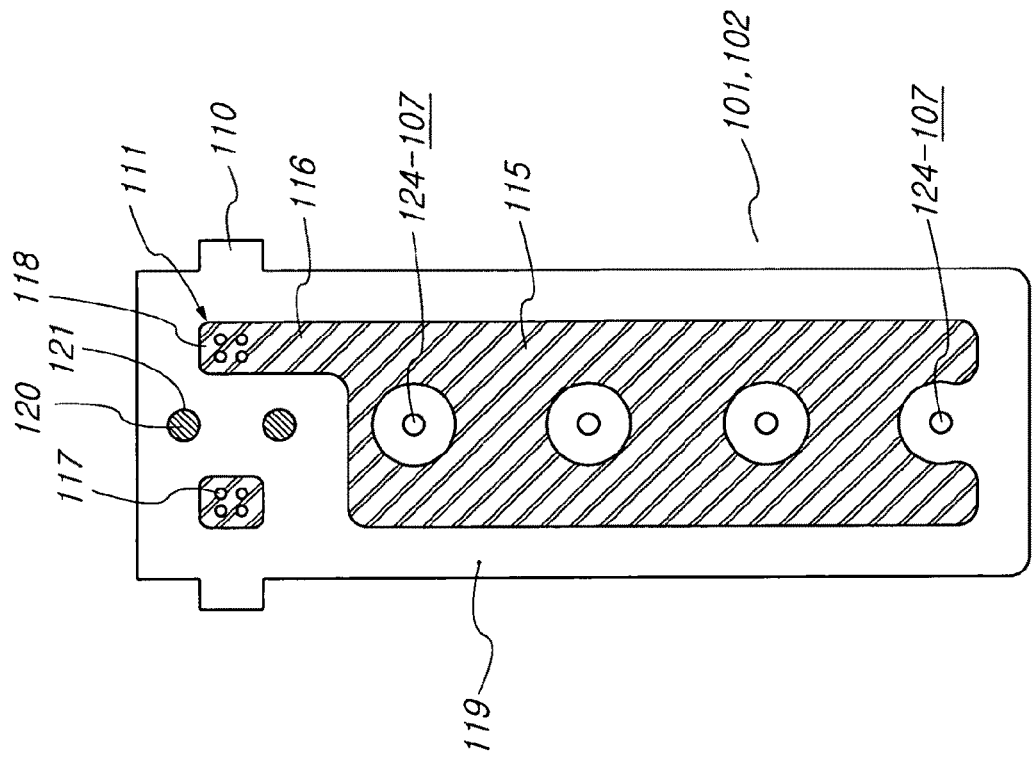
[Fig. 10]
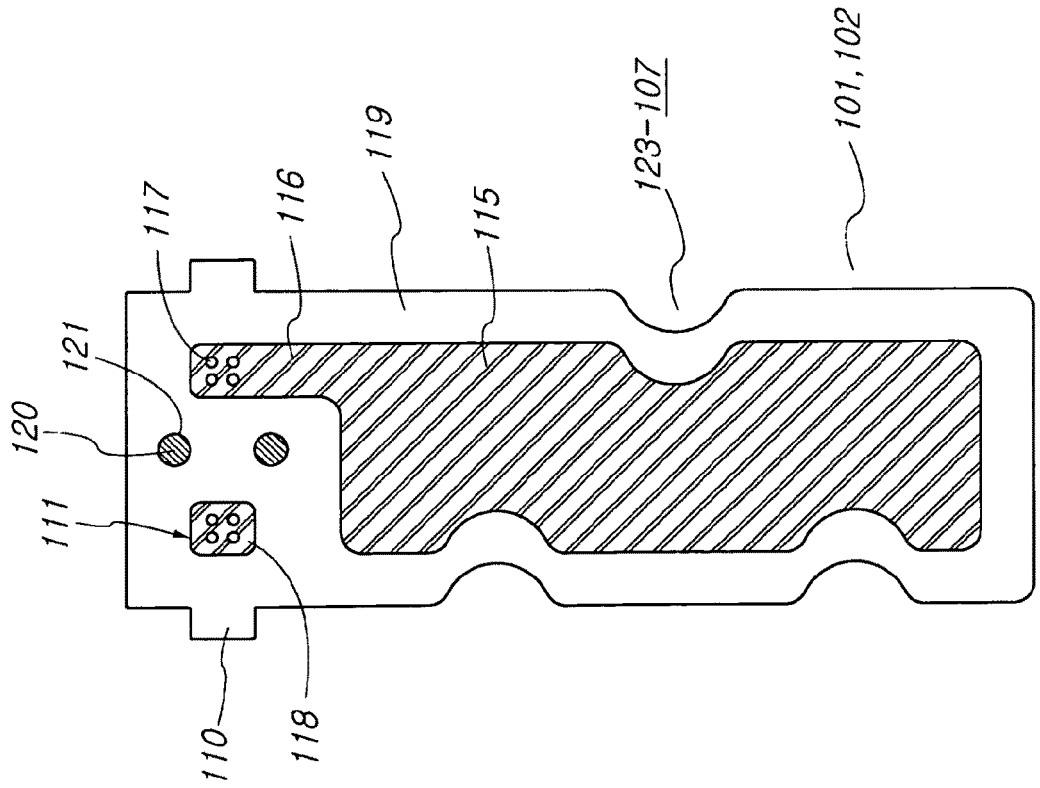

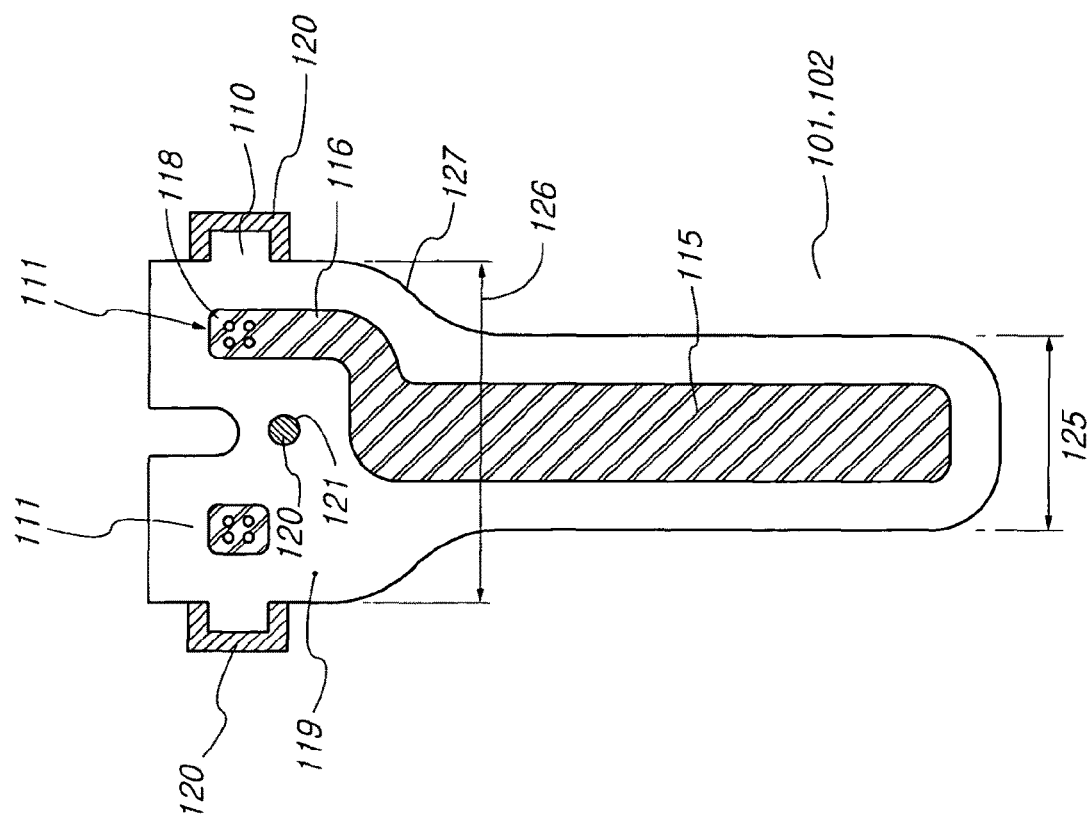
[Fig. 11]

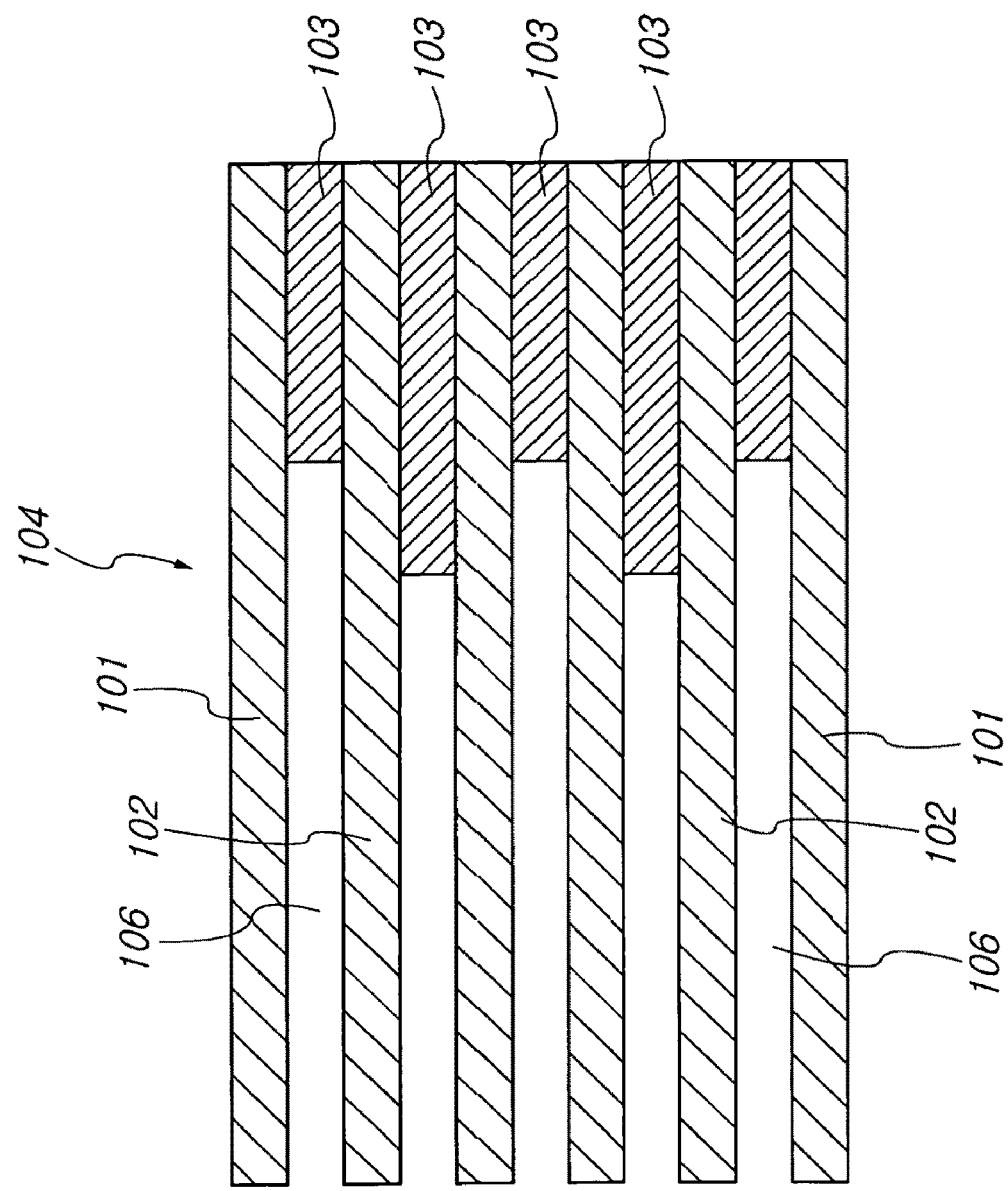
[Fig. 12]

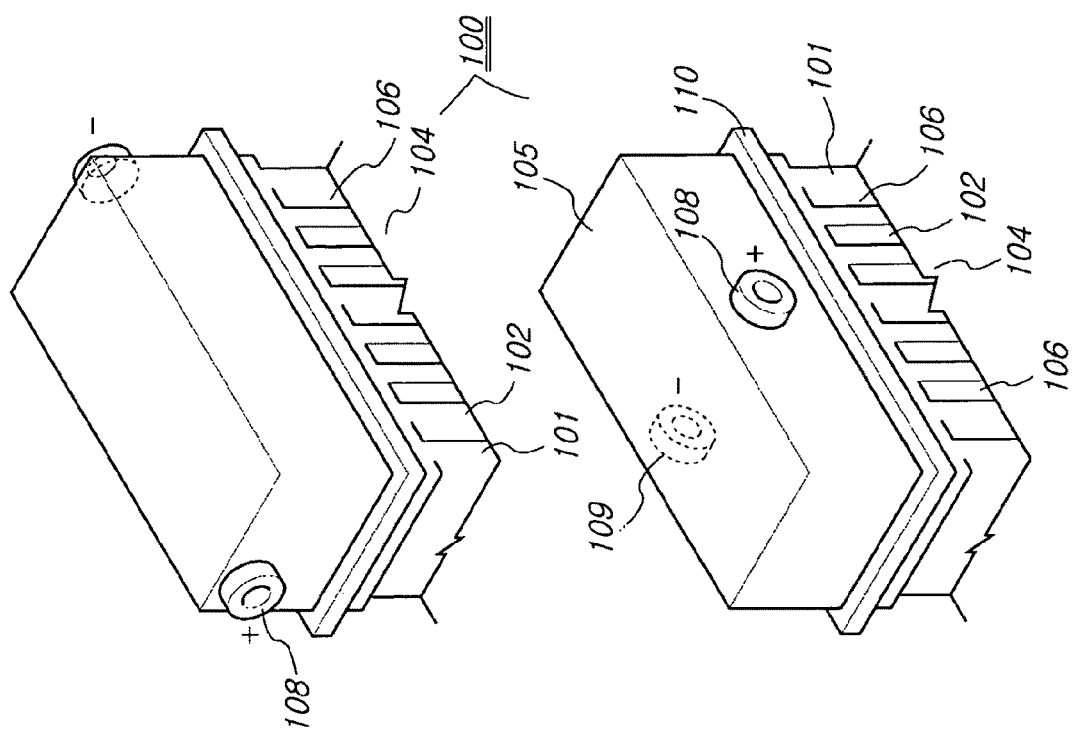
[Fig. 13]

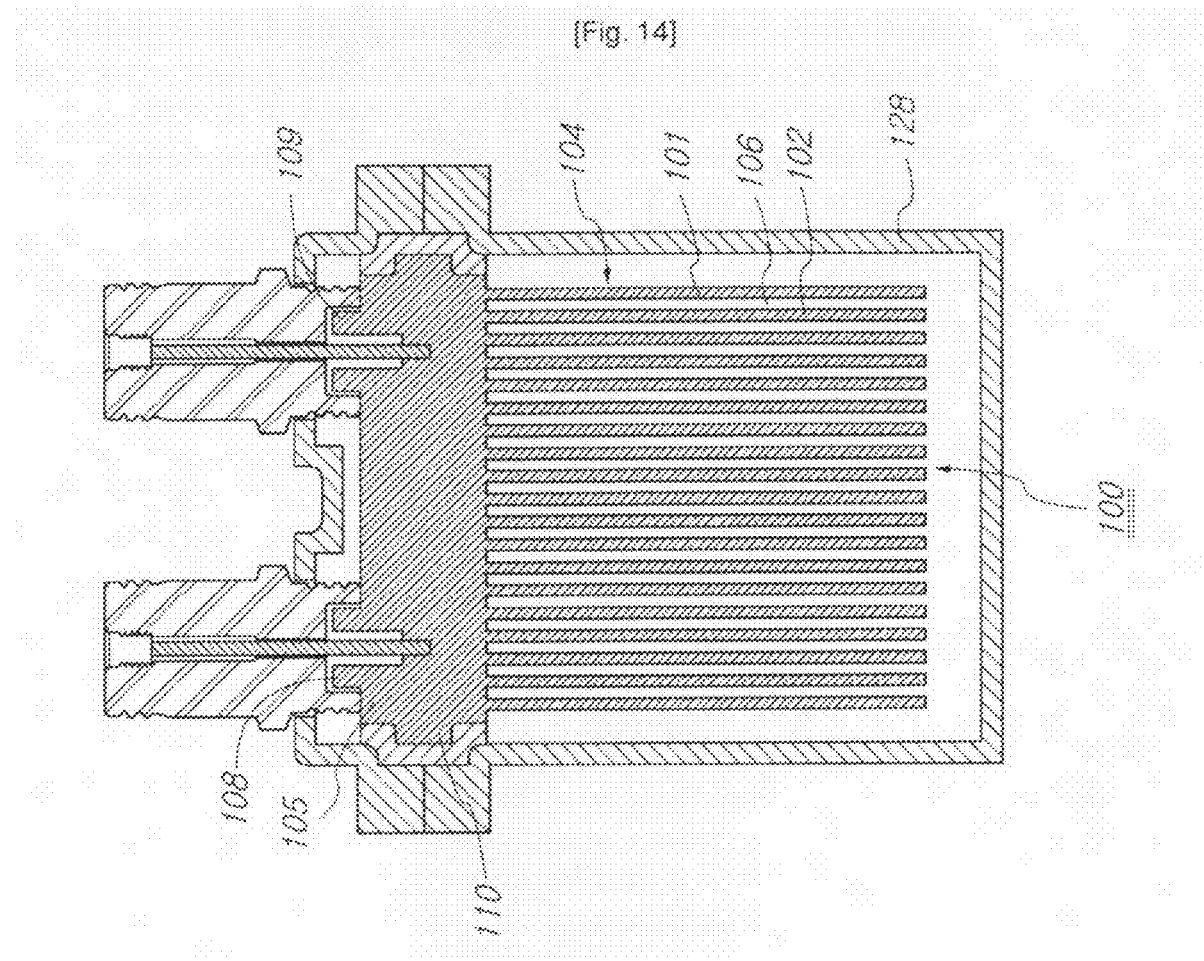

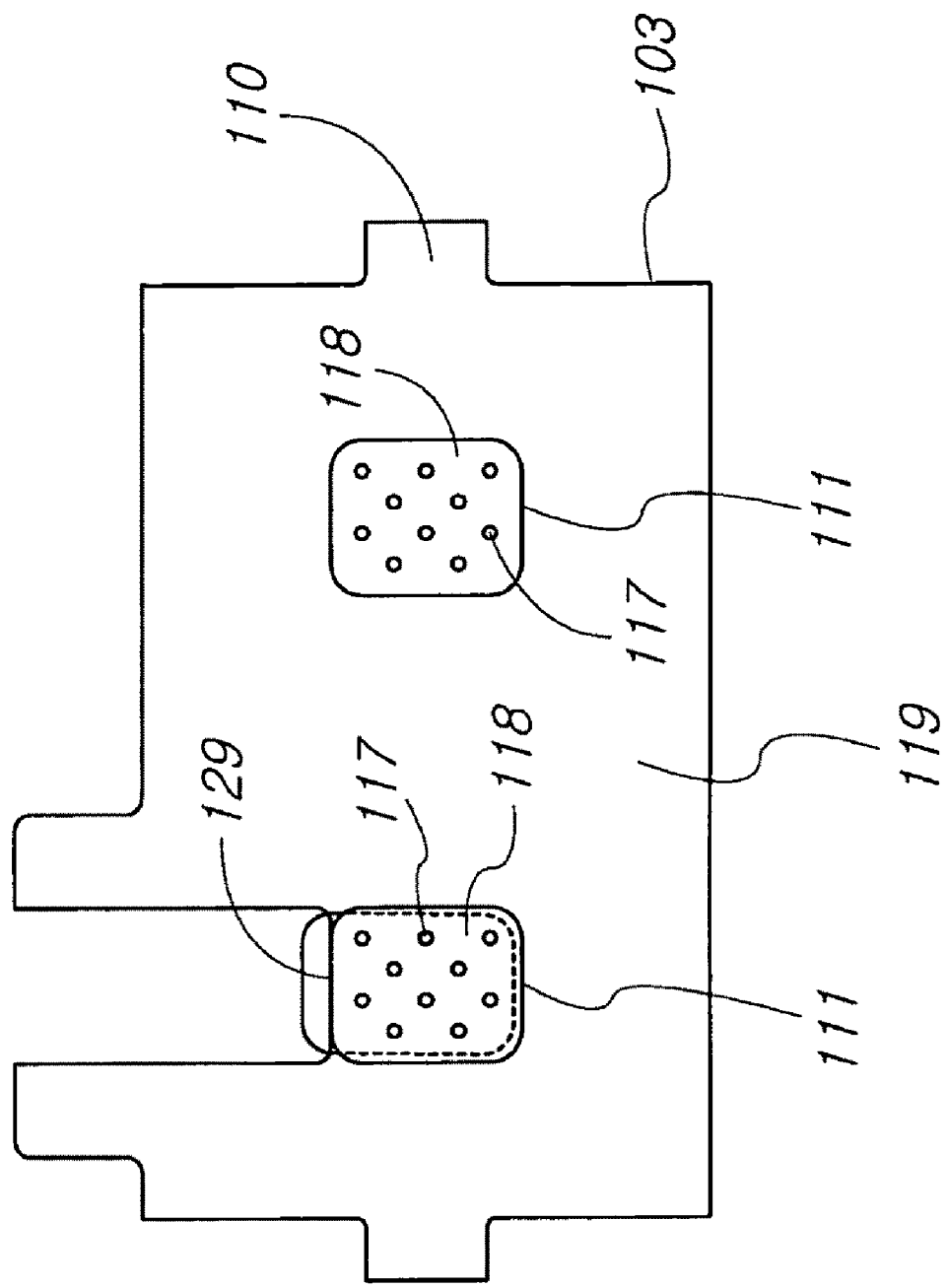
[Fig. 15]

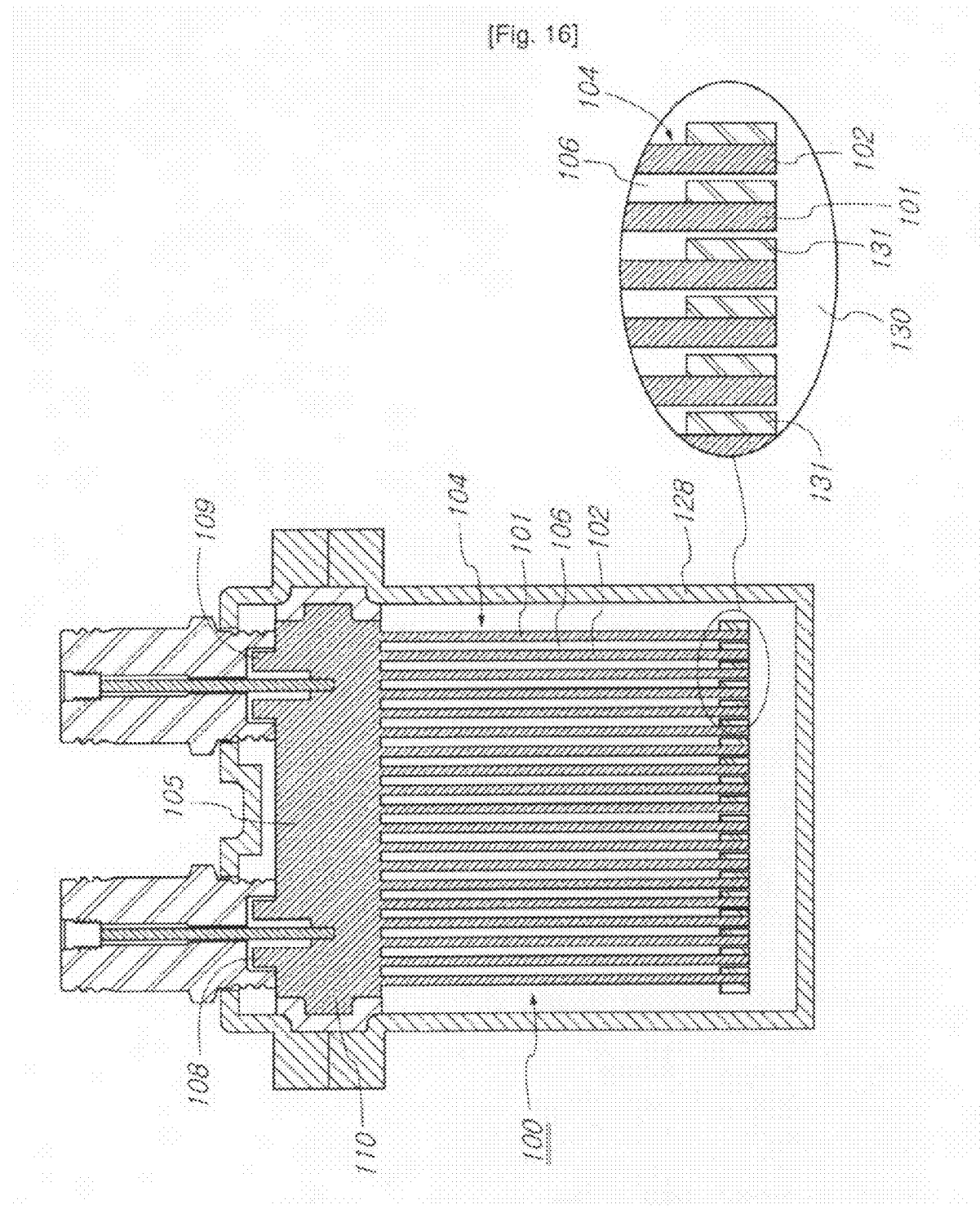

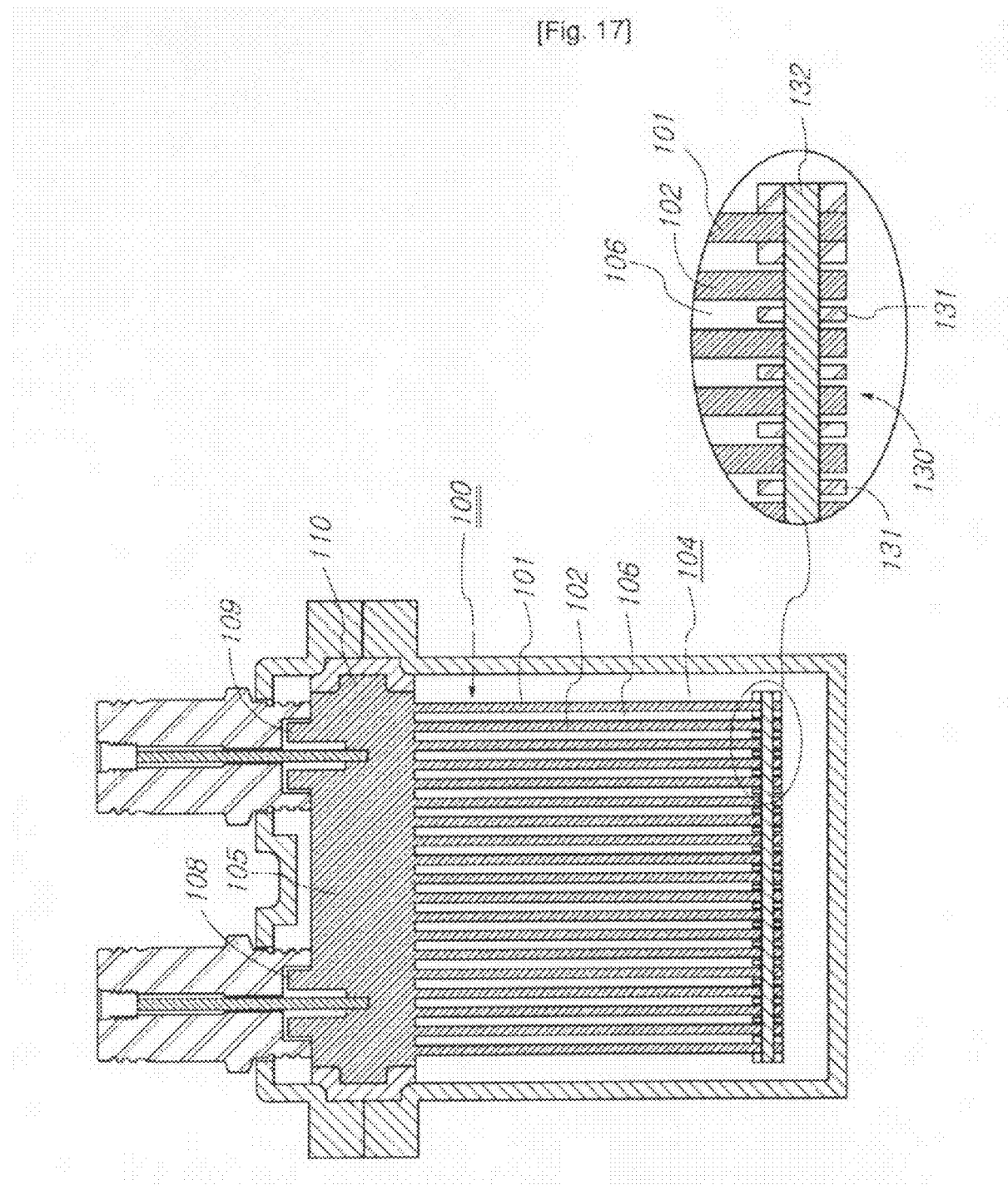

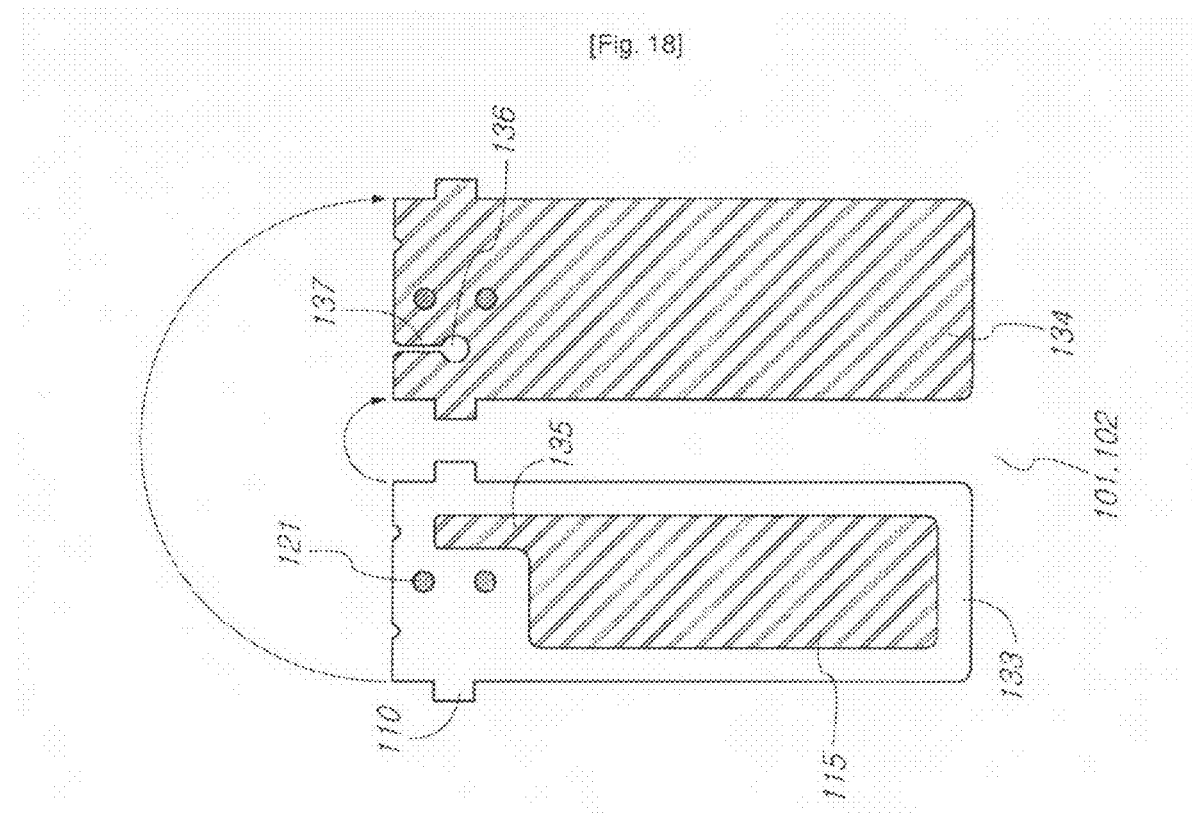
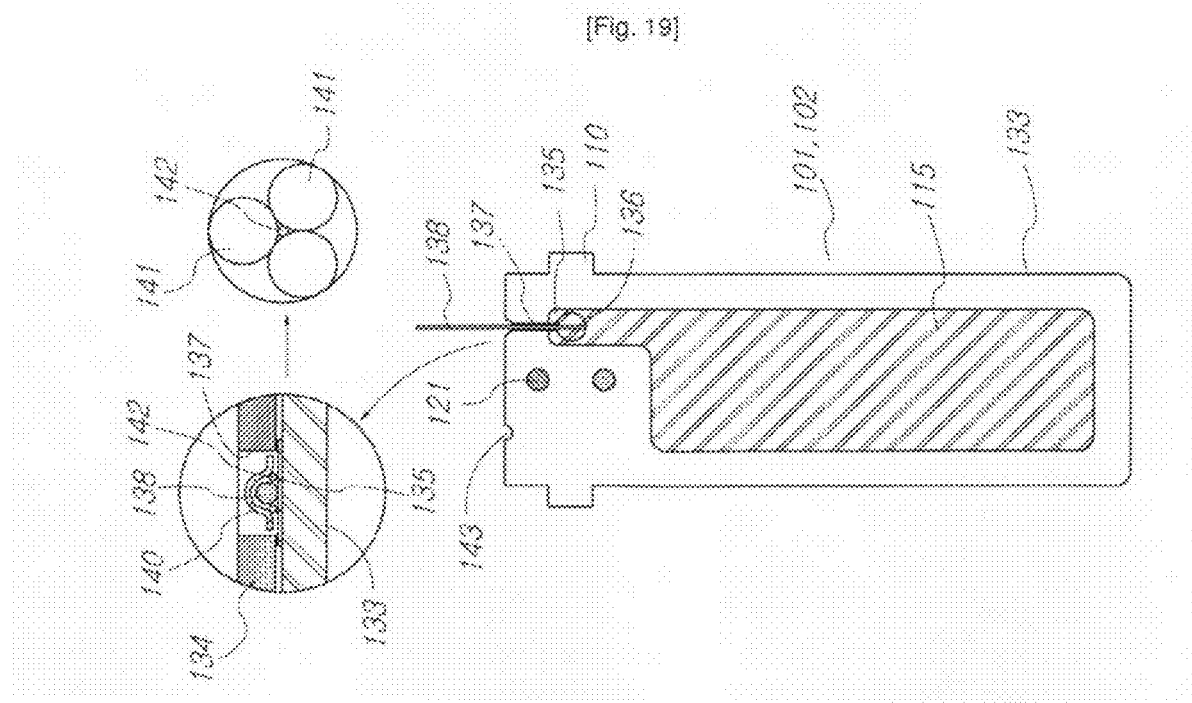

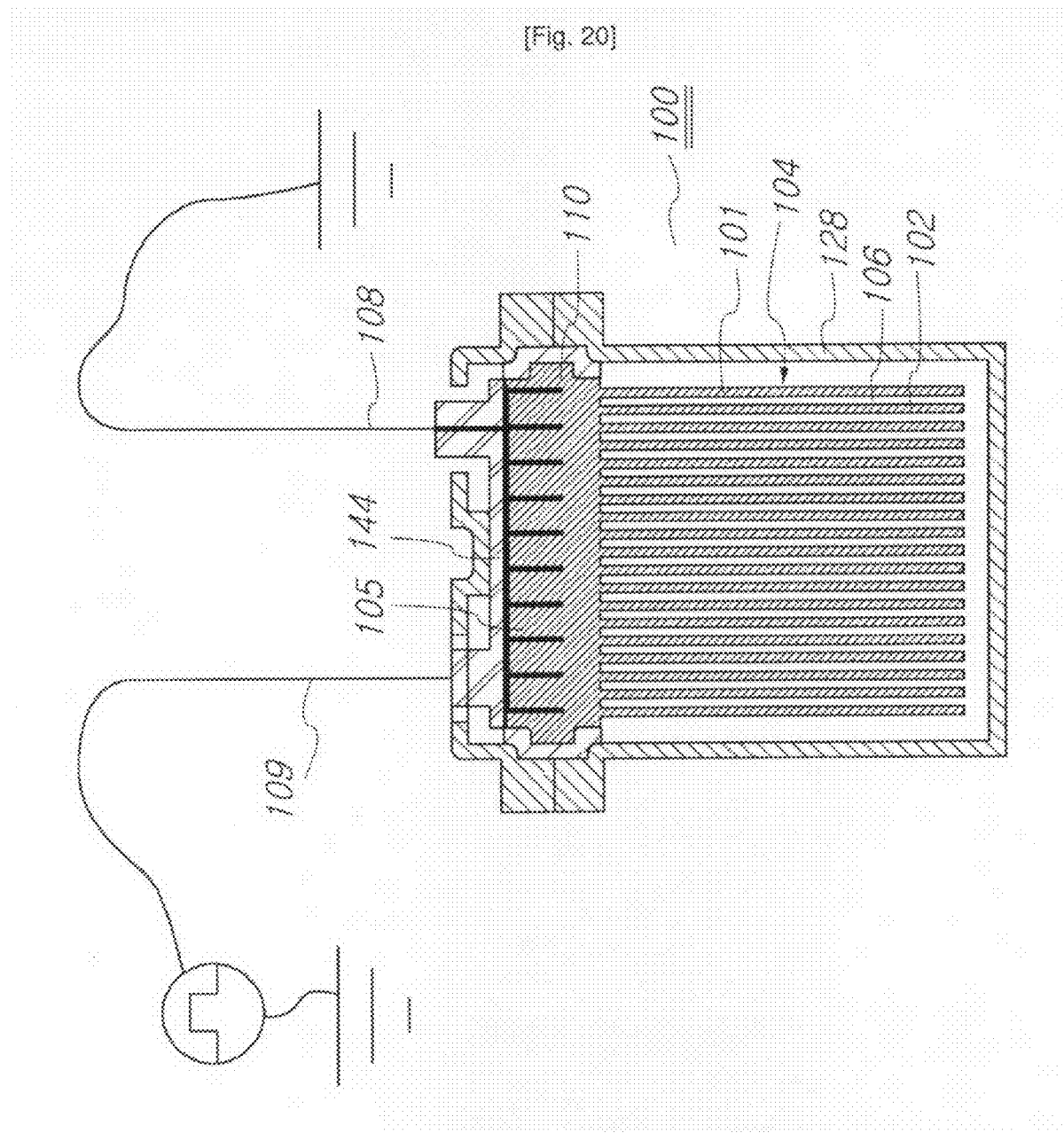
[Fig. 20]

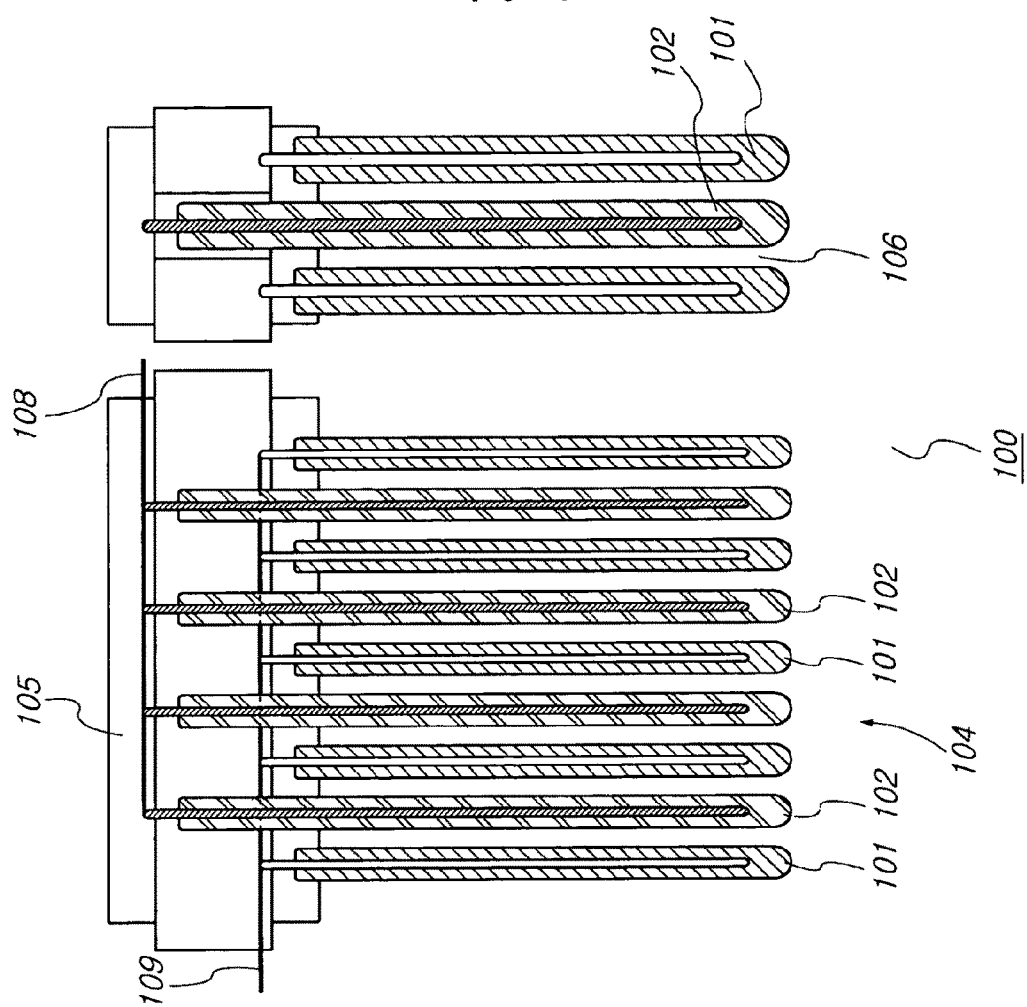
[Fig. 21]

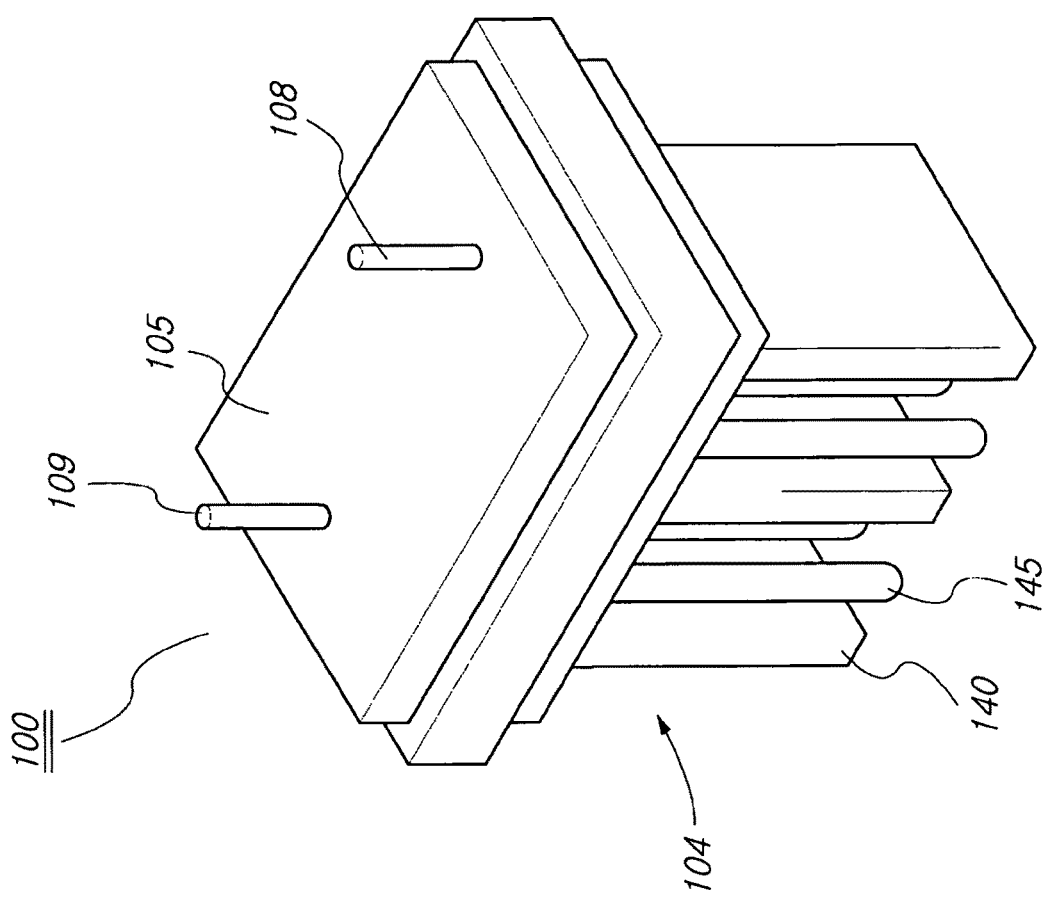
[Fig. 22]

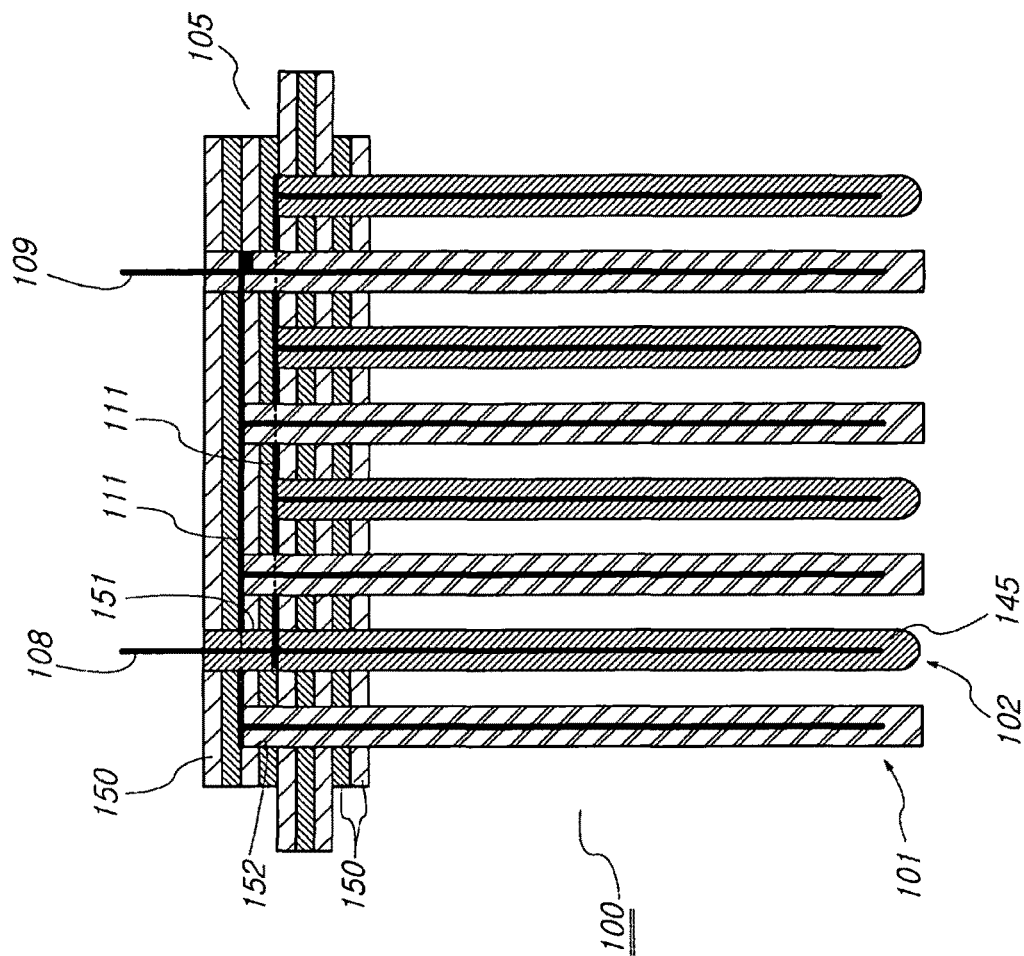
[Fig. 23]

PLASMA REACTOR

CROSS-REFERENCE TO RELATED APPLICATION

This application is a co-pending application which claims priority to PCT Application No. PCT/KR2007/003842, filed Aug. 10, 2007, with the Korean Patent Office claiming priority of Korean Patent Application 10-2006-0089186 filed on Sep. 14, 2006, herein incorporated by reference in its entirety.

TECHNICAL FIELD

The present invention relates to a plasma reactor (stacked non-thermal plasma reactor (NTPR)), and more particularly to a plasma reactor which is constructed such that a well-insulated high voltage power source supply is connected to electrodes so that it can generate stable and uniform plasma using low power consumption and which also has a structure facilitating the passage of gas through an inner region in which a plasma field is formed.

The plasma reactor has a variety of applications. For example, the plasma reactor can be used as part of a system that reduces or removes harmful gaseous or particulate matter in exhaust gases of vehicles or can be used to generate ozone in an apparatus for dissolving ozone in water.

Diesel engines have been strongly recommended as a solution to the low thermal efficiency and high fuel consumption problems of gasoline engines. The demand for diesel engines are expected to rapidly increase since users' preference is also toward increasing the thermal efficiency and decreasing the fuel consumption.

As the use of diesel engines has constantly increased, many developed countries have increased the stringency of the emission standard for exhaust gases of diesel engines and have controlled emission of harmful substances from diesel engines to reduce the emission. There is a need to provide a new concept of exhaust gas purification apparatus different from the conventional post-treatment apparatuses as countries, mainly Europe and the United States, have increased the control of the emission.

An exhaust gas purification system using plasma reaction is being recognized as an important technology since an exhaust gas purification system using a low temperature or non-thermal plasma (NTP) reaction can reduce both diesel particulate matter and NOx.

An ozone water production technology is to activate oxygen in the air through NTP reaction to generate ozone and then to dissolve it in water. This technology has a variety of advantages in that it has a high sterilization effect and promotes the purification action and also increases the solubility of oxygen in water to increase the amount of dissolved oxygen.

To increase these effects, it is essential to increase the concentration of ozone in the ozone water and therefore it is necessary to decrease the distance between the plasma reactor and water for dissolving ozone. It is also needed to cause stable plasma reaction even in gases containing a large amount of moisture since it is necessary to repeatedly dissolve ozone in the water.

According to the NTP method, which is a technology for decomposing or oxidizing harmful gases without any high temperature heat source, high-voltage AC power is supplied to a reactor including dielectric electrodes to generate low-temperature (non-thermal) plasma including electrons and ions under atmospheric pressure conditions and some electrons with high energy generated in this process are used to cause a chemical reaction with harmful gases to treat the harmful gases.

BACKGROUND ART

The harmful gas treatment technologies using low temperature plasma include:
U.S. Pat. No. 4,954,320, entitled "Reactive Bed Plasma Air Purification", granted to Joseph G. Birmingham, et al. on Sep. 4, 1990,
U.S. Pat. No. 5,236,672, entitled "Corona Destruction of Volatile Organic Compounds and Toxics", granted to Carlos M. Nunes, et al. on Aug. 17, 1993, and
U.S. Pat. No. 5,609,736, entitled "Methods and Apparatus for Controlling Toxic Compounds Using Catalysis-Assisted Non-Thermal Plasma", granted to Toshiaki Yamamoto on Mar. 11, 1997.

In the above related-art technologies, pulse power is used to generate low-temperature plasma or catalytic or ferroelectric beads are filled in the reactor to increase the reaction efficiency and to reduce secondary contaminants in gases that may be generated after reactions.

These technologies have been very rarely commercialized and used since aerosol byproducts generated during their processes may be attached to pipes to clog them or to degrade the electric characteristics of the reactor, thereby impeding continuous operation of processes.

Most reactors used in low temperature plasma processes suggested until now have a structure using pairs of electrodes, one being in the form of a cylinder and the other being in the form of a thin wire or a small diameter tube.

Although these reactors are similar to conventional middle or large-size ozone generators available in the market and thus have advantages in that heat generated in the reactors is discharged to the outside to reduce their operating temperature, they have problems in that their size is large compared to the flow rate of gas.

In some small-size ozone generators using the plasma generation principle, the reactor includes multi-plate electrodes. The most remarkable characteristic of reactors with the multi-plate or multi-cell electrodes, which are widely known in the art, is an increase in their operating temperature since it is difficult to transfer heat generated in the reactor to the outside, compared to reactors with a cylindrical structure.

Due to this characteristic, reactors with the multi-plate or multi-cell electrodes may be advantageous in a harmful gas removal process in which a process of oxidation and removal of byproducts attached in the reactor may be promoted or the rate of removal of harmful gases may increase as the operating temperature increases.

However, in a harmful gas treatment process in which air and exhaust gases containing a large amount of moisture and particulate matter are treated, in contrast to processes of the ozone generator that generates ozone from relatively clean air or oxygen, arc discharges may occur to cause a serious damage to reactors with a cylindrical structure.

Thus, there is a need to provide a non-thermal plasma (NTP) reactor including multi-plate or multi-cell electrodes capable of generating stable low-temperature plasma even in gases containing moisture and particulate matter.

The structures of electrodes for generating plasma are classified into a rod (or wire) to rod (or wire) structure, a rod to plate structure, and a plate to plate structure. The types of dielectric barrier design for stable plasma discharges without causing arc discharges are classified into a Dielectric Barrier Discharge (DBD) type and a packed bed type.

If the power of the plasma generator exceeds a specific level, the harmful gas decomposition capability of the plasma generator reaches its limit so that the harmful gas decomposition capability is no longer increased even though more energy is supplied, thus resulting in high power consumption.

In addition, if the applied voltage is too high, electrons concentrate locally in the plasma generation region to increase the possibility of causing arc discharges, thereby further reducing the efficiency.

Thus, dielectric electrodes for generating plasma are stacked in multiple layers at regular intervals to increase the reaction region where gases can be exposed to plasma, thereby increasing the treatment efficiency of exhaust gases or gases for reaction.

Various technologies of the structure and production of plasma reactors using multilayer dielectric electrodes have been developed due to such a variety of advantages.

The most recently granted or published technologies of plasma reactors using multilayer dielectric electrodes include:

U.S. Pat. No. 6,979,892, entitled "Laminated Co-fired Sandwiched Element For Non-Thermal Plasma Reactor", granted to Bob Xiaobin Li, et al. on Dec. 27, 2005, and Japanese Patent Application Publication No. 2005-188424, entitled "Plasma Generation Electrodes and Plasma Reactor" and filed by KONDO ATSUO, et al. and then published on Jul. 14, 2005.

In the U.S. Pat. No. 6,979,892, dielectric electrodes are manufactured by co-firing ceramic dielectric bodies, each including an embedded electrode with electrical conductivity, and the manufactured dielectric electrodes are arranged so that surfaces of electrodes with opposite polarities oppose each other to define gas passages at regular intervals between the electrodes and the arranged electrodes are then stacked and bonded together with spacers.

Each of the spacers and the dielectric electrodes manufactured through co-firing internally has a vertical electrical via at the center of a portion where they are bonded together. This increases the reliability of insulation to allow stable plasma generation in various use environments of the reactor, particularly exhaust gas environments exposed to gases including a large amount of moisture and particulate matter.

While each ceramic dielectric body (or each dielectric electrode) including an embedded electrode internally has a well-insulated electrical via, the ceramic dielectric body also has a vertical electrical via for an opposing electrode and thus it is fixed to both vertical connection stacks of opposite polarities.

This limits individual thermal expansion and contraction of each of the dielectric electrodes stacked at regular intervals in environments with serious changes in the temperature of gases, for example exhaust gas environments of vehicles or exhaust gas environments of high-temperature incinerators. The limitation may cause a very high thermal stress locally to the dielectric electrodes to break them.

The method of manufacturing ceramic dielectric bodies, each including an embedded electrode, through co-firing is very effective in achieving insulation of the electrodes to which a high voltage is applied. However, electrical vias, which electrically connect the electrodes, must be made of very expensive platinum since both electrical connection and insulation cannot be achieved under conditions such as the co-firing temperature. In addition, the temperature and atmosphere where the electrodes are stacked at regular intervals are different from those where the dielectric electrodes are manufactured. This difference results in a thermal mismatch between the bonding layers to cause a local thermal distortion/stress which may separate the layers.

In this technology, the exterior of each electrode for generating plasma is made of dielectric material for stable control of the high voltage applied to the electrode and thus to generate stable plasma and expensive metal is used to achieve both electrical connection and insulation of the dielectric electrodes as described above. However, the technology failed to solve the fundamental problems such as dielectric cracking, parting line gaps, and split gaps which may occur in use environments of the reactor with serious thermal changes.

In the Japanese patent application publication 2005-188424, one fixing end portion is provided to fix each pair of opposing dielectric electrodes and a free end portion is provided at the opposite side to allow the dielectric electrodes to deform due to their thermal expansion and contraction in use environments of the reactor with serious temperature changes, particularly in environments for removing exhaust gases of vehicles and harmful matter of incinerators. Although this technology can ease the thermal stress that may occur locally, it has the following variety of fundamental problems.

To complete a plasma reactor according to this technology, a fixing end portion of each of multilayer plasma reaction electrodes is fixed to a stack including support members through a surface pressure applied to fix the structure to a case. This plasma reactor has parting line gaps and split gaps from the beginning.

Even when the plasma reactor is installed in the case with the optimal shapes or arrangements such as the optimal interval between gaps and the insulation distance, it is difficult to maintain the shapes uniform if both the plasma reactor and the case that applies the surface pressure to it repeat thermal expansion and contraction as the temperature changes and the exhaust gas pressure is constantly and repeatedly applied to the reactor.

In the structure where the fixing end portions are fixed only by the surface pressure, separation of layers will not only be constantly increased but moisture and particulate matter may also be constantly introduced into the parting line gaps and the split gaps in an environment exposed to gases including a large amount of moisture and particulate matter. Thus, this structure is very inappropriate taking into consideration the environment of using high voltages.

To compensate for these problems, it is necessary to provide a greater insulation distance for the limited dielectric electrode area. However, this may make it more difficult to secure the reliability of insulation while making the insulation members and the stacking method more complicated.

That is, terminals connected to an external power supply are easily exposed to moisture and particulate matter in the case, thereby easily causing arc or abnormal discharges. From the viewpoint of their structures, such reactors will have a great weight and will also require high manufacturing costs.

For these non-thermal plasma (NTP) reactors, it is very important to achieve insulation of connections between electrodes for stable control of high voltages due to the characteristics of the NTP reactors.

On the other hand, due to their characteristics, the components of plasma reactors using high voltages are mostly made of ceramic dielectric material. Especially, when the dielectric components are exposed to an environment with rapid temperature changes of exhaust gases as with exhaust gases of engines, the dielectric components are vulnerable to rapid temperature changes so that cracking, breakage, layer separation, and the like occur in reaction electrodes, electrode connectors, and the like, thereby failing to achieve the purpose of the dielectric material for proper control of high voltages.

It is essential for the plasma reactor not only to have insulation properties but also to have a resistance to thermal shocks that is applicable to the use environment of the plasma reactor.

From the viewpoint of material of each component of the plasma reactor, the resistance to thermal shocks can be increased by improving the thermal and mechanical properties of the material. However, selection of the material may be limited when the selection is made from materials with good electrical characteristics (especially, insulation performance and dielectric strength) that satisfy requirements of the durability, the plasma generation efficiency, and the like.

DISCLOSURE OF INVENTION

Technical Problem

The present invention suggests a plasma reactor and a method for manufacturing the same, wherein the plasma reactor has a structure capable of absorbing thermal stress that may occur locally in the reactor in an environment with serious thermal changes, particularly an environment with serious gas temperature changes like a vehicle exhaust gas environment, and can secure electrical insulation even when it is exposed to a gas flow including moisture, particulate matter, and the like and the plasma reactor also simplifies the method of fixing it to one side of a case, thereby allowing reliable fixation of the reactor without applying unnecessary pressure to the reactor.

The present invention provides a non-thermal plasma (NTP) reactor having multiple dielectric electrodes constructed such that two well-insulated vertical connection wires with opposite polarities are provided in a stack, dielectric electrodes of opposite polarities are alternately provided at regular intervals at one side of the stack to form gas passages and also to provide plasma generation regions so as to allow the dielectric electrodes to freely expand and contract in an environment with serious gas temperature changes, thereby minimizing the occurrence of local thermal stress.

The above configuration allows two external terminals of opposite polarities to be formed on a stack. This makes it very easy and simple to perform the method of fixing the plasma reactor to the case or the method of supplying or connecting the external power source, thereby providing a structure which can avoid mechanical and electrical instability which may occur in the reactor and can also secure the stability of plasma generation.

The present invention also provides a method of insulating internal electrical vias connected vertically and horizontally through bonding and sealing using glass fusion or ceramic firing, thereby fixing the structure so as not to be altered by vibration, exhaust gas pressure, or the like. The present invention thus suggests a structure that prevents moisture and particulate matter from penetrating into parting line gaps, thereby allowing formation of stable plasma fields.

The vertical connection electrode portions and the main electrode portions of the dielectric electrodes are formed in a variety of shapes such as slits, holes, or circles to provide a structure which can disperse local thermal stress in each element.

Thus, it is an object of the present invention to provide various structures of reactors through appropriate embodiments with the above configurations, thereby improving insulation properties and resistance to thermal shocks and eliminating mechanical and electrical instabilities of reactors.

Technical Solution

The present invention provides a plasma reactor and a method for manufacturing the same, wherein the plasma reactor has a structure which allows the reactor to generate uniform and stable plasma with low power and to reduce the resistance of gases that passes through the plasma reactor and which also increases the durability to allow stable operation of the reactor in environments selectively or collectively applied to the reactor such as a thermal shock environment with serious gas temperature changes or an environment where the gases passing through the reactor contain a large amount of moisture, corrosive gases, particulate matter, and the like.

Advantageous Effects

The plasma reactor according to the present invention has high durability and has performance to generate stable and uniform plasma. The plasma reactor according to the present invention has a variety of advantages such as increasing the range of commercial applications of the plasma reactor since the plasma reactor has a structure that allows simple and efficient installation and operation in a system at a position required by the system.

BRIEF DESCRIPTION OF THE DRAWINGS

FIG. 1 is a front and bottom perspective view of a plasma reactor according to the present invention;

FIG. 2 is a cross-sectional view of a plasma reactor according to the present invention;

FIG. 3 is an exploded perspective view of electrodes and spacers applied to a plasma reactor according to the present invention;

FIG. 4 is a perspective view of an electrode applied to a plasma reactor according to the present invention;

FIG. 5 is a cross-sectional view of the electrode applied to the plasma reactor according to the present invention, taken along a line A-A of FIG. 4;

FIG. 6 is a cross-sectional view of the electrode applied to the plasma reactor according to the present invention, taken along a line C-C of FIG. 4;

FIG. 7 is a cross-sectional view of the electrode applied to the plasma reactor according to the present invention, taken along the line B-B of FIG. 4;

FIGS. 8 to 12 illustrate applications of deformation preventing means to a plasma reactor according to the present invention to prevent damage and deformation of the plasma reactor due to thermal shock;

FIG. 13 is a perspective view illustrating changes of the positions of external terminals on a plasma reactor according to the present invention;

FIG. 14 is a cross-sectional view of a plasma reactor according to the present invention when it is fixed to a case;

FIG. 15 illustrates another example of the drawing-out of external terminals in a plasma reactor according to the present invention;

FIG. 16 is a cross-sectional view showing a first example of a free end limiting portion of a plasma reactor according to the present invention;

FIG. 17 is a cross-sectional view showing a second example of the free end limiting portion of the plasma reactor according to the present invention;

FIG. 18 is an exploded view of an electrode of a plasma reactor according to a second embodiment of the present invention;

FIG. 19 is an assembled view of the electrode of the plasma reactor shown in FIG. 18;

FIG. 20 is a cross-sectional view of the plasma reactor shown in FIG. 18 when it is combined with a case;

FIG. 21 is a front and side cross-sectional view of a plasma reactor according to a third embodiment of the present invention;

FIG. 22 is a perspective view of a plasma reactor according to a fourth embodiment of the present invention; and FIG. 23 is a schematic cross-sectional view of a plasma reactor according to a fifth embodiment of the present invention.

BEST MODE FOR CARRYING OUT THE INVENTION

As shown in FIG. 1, a plasma reactor 100 of the present invention includes a stack 104 and a reactor body 105. The stack 104 is constructed by sequentially stacking plus electrodes 101 and minus electrodes 102 with opposite polarities and spacers 103. The reactor body 105, which is made of the same material as the stack 104, is provided at one side of the stack 104 to hold the stack 104.

The plus electrodes 101 and the minus electrodes 102 included in the stack 104 are arranged alternately with spacers 103 to define passages through which gas is allowed to pass.

The stack 104 has an appropriate structure for stress dispersion since the reactor body 105 is fixed to only one side of the stack 104 to hold the stack 104. Each of the plus and minus electrodes 101 and 102 has deformation preventing means 107 to prevent a local thermal stress caused by thermal expansion and contraction or the like, thereby increasing the thermal shock-resistant performance.

External terminals 108 and 109 for connection to the plus and minus electrodes 101 and 102 are provided on the reactor body 105 located at one side of the stack 104. The external terminals 108 and 109 have a structure which allows power supply connection portions exposed to high voltage to be simply and effectively shielded from a large amount of moisture, harmful particulate matter, or gases of various environments such as corrosive gases, which degrade electrical insulation performance, thereby increasing the reliability of insulation.

A projection 110 is formed on a surface of the reactor body 105 in a direction perpendicular to the direction along which the elements of the stack 104 are stacked. The projection 110 allows the plasma reactor 100 to be easily fixed to a case, thereby decreasing the total weight.

Each of the plus and minus electrodes 101 and 102 includes a conductive electrode that is insulated from neighboring plus and minus electrodes 101 and 102 with the opposite polarity and includes a vertical connection electrode 111 that connects each of the plus and minus electrodes 101 and 102 to neighboring plus and minus electrodes 101 and 102 with the same polarity.

The plus electrodes 101 are connected to each other through vertical connection electrodes 111 and the minus electrodes 102 are connected to each other through vertical connection electrodes 111 and the plus and minus electrodes are then connected to the external terminals 108 and 109 provided on the surface of the reactor body 105 holding the stack 104. The external terminals 108 and 109 are connected to a pulse or AC power supply to allow plasma to be generated at conductive electrode portions included in opposing plus and minus electrodes 101 and 102 with opposite polarities.

Mode for the Invention

FIG. 3 is an exploded perspective view of electrodes and spacers applied to a plasma reactor according to the present invention, FIG. 4 is a perspective view of an electrode applied to a plasma reactor according to the present invention, FIG. 5 is a cross-sectional view of the electrode applied to the plasma reactor according to the present invention, taken along a line A-A of FIG. 4, FIG. 6 is a cross-sectional view of the electrode applied to the plasma reactor according to the present invention, taken along a line C-C of FIG. 4, and FIG. 7 is a cross-sectional view of the electrode applied to the plasma reactor according to the present invention, taken along the line B-B of FIG. 4.

Each of the plus and minus electrodes 101 and 102 includes a main electrode portion 115, corresponding to a region to generate plasma, formed over the entirety of the corresponding plus or minus electrode 101 or 102, two vertical connection electrodes 111 provided on a stack portion of the plus or minus electrode 101 or 102, and a horizontal connection electrode 116 that connects the main electrode portion 115 to one of the two vertical connection electrodes 111.

Each of the vertical connection electrodes 111 has one or more conducting holes 117 that penetrate the corresponding plus or minus electrode 101 or 102 vertically with respect to the surface of the plus or minus electrode 101 or 102. A conducting substance 118 such as a conductive metal is filled in the conducting holes 117 or is coated on inner surfaces of the conducting holes 117 to allow electrical connection between electrodes of two surfaces including the conducting holes 117.

The vertical connection electrode 111 which is not connected to the main electrode portion 115 is electrically connected vertically to a neighboring plus or minus electrode 101 or 102 with the opposite polarity to achieve a stacked array of plus and minus electrodes 101 and 102 with the two opposite polarities efficiently insulated from each other.

The plus and minus electrodes 101 and 102, each including the main electrode portion 115 and the vertical connection electrodes 111, may be manufactured using a known co-firing technology in the following manner. The main electrode portion 115 is formed on an unfired green sheet by coating a conductive metal layer in a pattern according to the present invention on the unfired green sheet. Another green sheet having the patterns of the vertical connection electrodes 111 is prepared using the same method. The two green sheets are then laminated and co-fired to manufacture the plus and minus electrodes 101 and 102, each including the main electrode portion 115 and the vertical connection electrodes 111.

More preferably, not only the plus and minus electrodes 101 and 102 but also the electrical connections between each of the plus and minus electrodes 101 and 102 with opposite polarities arranged alternately are formed into the single stack 104 through co-firing according to the above method.

However, it is difficult to form each gas passage while accurately controlling the intervals between electrodes for uniform plasma generation. A degreasing process for eliminating an organic binder of each ceramic green sheet, an organic material used in the lamination process for forming the stack, and the like is very complicated and requires high costs, thereby making commercial production difficult.

In one alternative method according to the present invention, the electrodes are formed on two sintered ceramic bodies and the entire surfaces excluding the three electrodes or excluding the vertical connection electrode alone are coated with a ceramic adhesive or a glass adhesive, instead of using the method of insulating conductive electrodes through co-firing, and are then degreased and fusion-bonded or firing-bonded to construct plus and minus electrodes 101 and 102.

A glass or ceramic adhesive is coated on the entire surfaces excluding the vertical connection electrodes 111 of the two opposite polarities and a degreased spacer 103 and the plus and minus electrodes 101 and 102 are then fusion-bonded or firing-bonded to constitute the stack 104.

Here, the process of manufacturing the plus and minus electrodes 101 and 102 and the process of constituting the insulating stack 104 including the spacer 103 may be performed at the same time.

Glass fusion bonding is a process in which glass is completely melted generally at about 400-1000° C. to form an amorphous bond layer on a ceramic surface and ceramic firing bonding is a process in which a bond layer including a mixture of amorphous and crystalline particles is formed on a ceramic surface through growth and contraction or creation and annihilation of ceramic particles generally at about 1000-1600° C.

If there is a large difference between the firing and bonding temperatures of a sintered ceramic body when it is exposed to a serious temperature changing environment, the large temperature difference may cause a serious thermal mismatch. If the firing and bonding temperatures are equal, the sintered body may be deformed or the strength of the sintered body may be reduced due to excessive firing. Thus, it is necessary to select appropriate levels of the temperatures.

According to the above method, the plus and minus electrodes 101 and 102 to be stacked at regular intervals are less likely to be deformed since the method uses a sintered ceramic plate. The method is practically useful since it is also easy to perform the electrode formation process and the adhesive coating and burn-out process of organic binder before bonding is performed.

In another preferable method, sintered bodies of plus and minus electrodes 101 and 102 manufactured according to a known co□-firing method, each including an embedded main electrode portion 115, two vertical connection electrodes 111, and a horizontal connection electrode 116 connecting one of the vertical connection electrodes 111 to the minus electrode 102, and a spacer 103, which is a sintered ceramic body including two vertical connection electrodes 111, are stacked and bonded together through ceramic firing.

The plus and minus electrodes 101 and 102 of the plasma reactor 100 according to the present invention can be manufactured using sintered dielectric ceramic bodies. Specifically, a conducting metal layer is formed in an inner area at an appropriate insulating distance from the interface of the substrate and two dielectric ceramic bodies are bonded together with the conducting metal layer located between them to form a dielectric electrode including a main electrode portion 115, a horizontal connection electrode 116, and vertical connection electrodes 111.

The plasma reactor 100 constructed as described above is characterized in that plus and minus electrodes 101 and 102 insulated from each other are arranged alternately in a single stack 104, thereby allowing efficient division (or distribution) of a limited insulating space. In addition, the plasma reactor 100 can also be designed with selective electrical vias between inner terminals insulated from each other, thereby allowing flexible arrangement of external terminals connected to the electrical vias.

The following are methods for forming the stack 104 of plus and minus electrodes 101 and 102 in the plasma reactor 100 having the characteristic shape of the present invention as described above. In one method, sintered bodies corresponding to plus and minus electrodes 101 and 102, each having one surface on which a bonding surface 119, a vertical connection electrode 111, a horizontal connection electrode 116, and a main electrode portion 115 are patterned and the other surface on which two vertical connection electrodes 111 and a bonding surface 119 are formed, are prepared so that they can be bonded to spacers 103 and are then bonded together to form a stack 104. In another method, conducting electrode layers in the same arrangement as described above are formed in a green body and are then co-fired. In another method, conducting electrode layers in the same arrangement as described above are formed in each of a pair of sintered ceramic bodies and the sintered ceramic bodies are fire-bonded to prepare a sintered ceramic body including embedded electrodes and such prepared sintered ceramic bodies are then bonded together to form a stack 104.

In each sintered ceramic plate prepared according to a variety of known ceramic substrate manufacturing technologies, at least one conducting hole 117 for vertical connection is each arranged at two positions of the stack portion and a column hole 121 for inserting and bonding a reinforcement column 120 capable of increasing the mechanical strength in a direction perpendicular to the bonding surface according to a conventional technology is formed at a center portion of the stacked portion between the vertical connection electrodes 111. A projection 110 is integrally formed at either side of the stack portion of each of the plus and minus electrodes 101 and 102 to make it easy to fix the plasma reactor 100 completed according to the present invention to the case.

The main component of an electrode layer used to form the main electrode portion 115, the vertical connection electrodes 111, and the horizontal connection electrode 116 when forming each of the plus and minus electrodes 101 and 102 using a sintered ceramic body is preferably a highly conductive metal. For example, the main component is an electrode material including at least one type of metal selected from the group consisting of W, Mo, Mn, Cr, Ni, Fe, Ag, Cu, Pt, and Pd.

The thickness of the electrode layer is preferably 0.01-0.1 mm and more preferably 0.01-0.015 mm since it is necessary to reduce the size of plasma generation electrodes and to reduce the resistance of fluid that passes through the gaps between opposing electrodes during treatment of exhaust gas.

The electrode layer is formed in the shape of a film on a sintered ceramic body. Examples of an appropriate coating method of the electrode layer include screen printing, calendar rolling, spraying, electrostatic coating, dipping, knife coater, CVD, PVD, or the like. According to this method, the evenness of the surface after the conductive layer is formed is excellent and it is also possible to easily form a thin electrode layer.

The electrode layer can be formed on the sintered ceramic body by mixing a powder of metal which is the main component of the electrode layer with a solvent such as an organic binder or terpineol to form a conductor paste and then coating the conductor paste on the sintered ceramic body according to the above method. An additive may be added to the conductor paste as needed to improve its adherence and sintering properties with the sintered ceramic body.

To construct each of the plus and minus electrodes 101 and 102 having an electrode layer inside it, it is necessary to form an electrode layer arranged at an appropriate insulating distance and to form a bonding surface 119 to allow two symmetric sintered ceramic plates to be bonded together. The bonding surface of each of the two sintered ceramic plates that are bonded together in this manner needs to have a vertical connection electrode 111 and at least one of the two sintered ceramic plates needs to have a main electrode portion 115 connected to a horizontal connection electrode 116 and a vertical connection electrode 111.

An adhesive may or may not be coated on the main electrode portion 115 or the horizontal connection electrode 116 while it is prevented from being coated on the vertical connection electrode. Although there is no specific limitation on an area to be coated with an adhesive, it is preferable that the area to be coated with an adhesive be designed to be large in order to increase the reliability of bonding or insulation.

The adhesive can bond two sintered ceramic bodies together to form an integrated ceramic body through glass fusion or ceramic firing and can be manufactured by appropriately mixing components such as alumina, silica, zirconia, boron oxide, sodium oxide, potassium oxide, and magnesium oxide. In the case of bonding through glass fusion, the phase of particles of the mixture of the above components is amorphous and bonding is possible at a relatively low temperature. In the case of bonding through ceramic firing, the above components in amorphous or crystalline phases are mixed so that the adhesive includes not only a fused amorphous layer but also a combination of crystalline particles.

Particles in an amorphous phase, whose melting point is higher than the bonding temperature, may be used instead of the crystalline particles. Ceramic firing is characterized in that the bonding temperature is high and bonding is possible in a variety of environments such as an oxidation or reduction atmosphere.

In the conventional technology, bonding through glass fusion in an oxidation atmosphere must be used when forming a stack of dielectric electrodes in order to construct a typical stack-type plasma reactor structure with highly reliable dielectric electrodes at regular intervals manufactured by high-temperature co-firing. Thus, vertical connection electrodes 111 having horizontal connection holes, included in the dielectric electrodes, must be formed using expensive rare metals such as Pt that can withstand high temperature and is highly resistant to oxidation.

Electrodes of material with a high melting point such as W or Mo, which is highly conductive and allows appropriate sintering at a ceramic firing temperature and which is also stable in a reduction atmosphere although it is inexpensive, are used in order to use the high-temperature co-firing method. Therefore, in a process that is exposed to high temperature in an oxidation atmosphere, the electrodes may be oxidized and lose their electric conductivity when they are exposed to a heat treatment atmosphere through a vertical connection.

In order to prevent this, it is necessary to use co-firing not only to manufacture the plus and minus electrodes 101 and 102 but also to bond them together to form the stack. However, when the plus and minus electrodes 101 and 102 are bonded together to form the stack through co-firing as described above, an electrode structure with two types of electrodes must be used since there are problems in that it is difficult to control the intervals between electrode surfaces of the main electrode portions 115 to be constant and a very unstable process must be performed to remove organic matter included in the structure.

Use of the bonding through ceramic firing, which is one feature of the present invention, eliminates the need to construct the electrode structure with two types of electrode materials and also allows the use of an inexpensive electrode material with excellent advantages.

The glass fusion or ceramic firing adhesive can be formed by mixing a ceramic powder with a solvent such as an organic binder or terpineol to form an adhesive paste and then coating the adhesive paste on the sintered ceramic electrode body according to a variety of known coating methods such as screen printing, calendar rolling, spraying, or the like.

The sintered ceramic body becomes ready for bonding upon completion of burn-out or burn-out and semi-firing after the bonding surface 119 is formed on the sintered ceramic body having the electrode layer.

The plus and minus electrodes 101 and 102 may be manufactured individually using sintered ceramic bodies and may also be manufactured through bonding at the same time as when the plus and minus electrodes 101 and 102 are bonded together to form the stack. In the latter case, before they are bonded together, each of the plus and minus electrodes 101 and 102 needs to be in a state in which degreasing or degreasing and semi-firing of each of the plus and minus electrodes 101 and 102 has been completed after an electrode layer is formed on the two vertical connection electrodes 111 and a bonding surface 119 is formed on an area excluding the two vertical connection electrodes 111 in the surface of each of the plus and minus electrodes 101 and 102 opposite to the surface including the main electrode portion 115 (i.e., in the surface to be bonded to the spacer 103) to achieve vertical electrical connection and insulated bonding.

Since the electrode layer is provided inside each of the ceramic plates which include the plasma generation electrodes and function as the plus and minus electrodes 101 and 102 as described above, it is possible to reduce the occurrence of abnormal discharges such as sparks, compared to when electrode layers are used alone to cause discharges, and to cause small discharges at a plurality of positions.

Since small current flows compared to when spark discharges occur, the small discharges can significantly reduce power consumption and can generate non-thermal plasma with low energy consumption and without causing an increase in the temperature, while limiting the current flowing between the plus and minus electrodes 101 and 102.

The main component of the sintered ceramic plate is preferably a high-k material and an appropriate material is selected, for example from the group consisting of aluminum oxide, zirconium oxide, silicon oxide, cordierite, mullite, titanium-barium-based oxide, magnesium-calcium-titanium-based oxide, barium-titanium-zinc-based oxide, silicon nitride, and aluminum nitride.

The plasma generation electrode can be operated under high-temperature and serious temperature changing conditions if the main component of the sintered ceramic plate is a material that is highly resistant to thermal shock. If a high-k material is used for the sintered ceramic plate, it is possible to reduce the size of the dielectric electrode since the discharge efficiency is high and also to reduce thermal stress caused by large deformation due to high thermal expansion.

The method for manufacturing the plus and minus electrodes 101 and 102 in the characteristic shapes according to the present invention is not limited to ceramic firing bonding or glass fusion bonding and sintered dielectric electrodes may also be manufactured through co-firing.

The main component of an electrode layer used to form the main electrode portion 115, the vertical connection electrodes 111, and the horizontal connection electrode 116 when forming each of the dielectric electrodes through co-firing, which is a widely known technology, is preferably a highly conductive metal. For example, the main component is an electrode material including at least one type of metal selected from the group consisting of W, Mo, Mn, Cr, Ni, Fe, Ag, Cu, Pt, and Pd.

The electrode layer is formed in the shape of a film on a tape-shaped ceramic green body. Specific examples of an appropriate coating method of the electrode layer include screen printing, calendar rolling, spraying, electrostatic coating, dipping, knife coater, CVD, PVD, or the like. According to this method, the evenness of the surface after the layer is formed is excellent and it is also possible to easily form a thin electrode layer.

The electrode layer can be formed on the tape-shaped ceramic green body by mixing a powder of metal which is the main component of the electrode layer with a solvent such as an organic binder or terpineol to form a conductor paste and then coating the conductor paste on the tape-shaped ceramic green body according to the above method. An additive may be added to the conductor paste as needed to improve its adherence and sintering properties with a tape-shaped ceramic green body.

A ceramic green sheet for ceramic substrates can be appropriately used as the tape-shaped ceramic green body. The ceramic green sheet can be formed by forming a slurry or paste for use in manufacturing green sheets to a specific thickness according to a conventional method such as a doctor blade method, a calendar method, a printing method, a reverse roll cotter method, or an extrusion method. Ceramic green sheets formed in this manner may be subjected to processing such as cutting, cutting-off, or penetration to form a hole and a number of stacked green sheets may also be bonded together to form a single-sheet stack through heat press or the like.

An appropriately controlled mixture of a ceramic powder with an appropriate binder, sintering additive, plasticizer, dispersant, organic solvent, and the like can be used as the slurry or paste for use in manufacturing green sheets. Examples of the ceramic powder include a powder of alumina, mullite, cordierite, silicon nitride, and aluminum nitride, ceramic glass, glass, or the like. Examples of the sintering additive include silicon oxide, magnesium oxide, calcium oxide, titanium oxide, zirconium oxide, or the like in the case of the powder of alumina. It is preferable that a 3-10 mass part of sintering additive be added to a 100 mass part of ceramic powder. The plasticizer, dispersant, and organic solvent may be appropriate ones used in conventional methods.

The porosity of the ceramic plate is preferably 0.1-35% and more preferably 0.1-10%. This configuration makes it possible to efficiently generate plasma between opposing electrodes, thereby achieving a reduction in the energy consumption.

Spacers 103 provide regular intervals, which are provided as plasma reaction areas and also serve as gas passages, and allow vertical connection wires with opposite polarities to secure an insulation distance from each other and from the outer case. Such spacers 103 are prepared in the following manner in order to manufacture a stack-type plasma reactor using two sintered ceramic plates, each including an electrode layer and an adhesive layer capable of bonding through glass fusion or ceramic firing, a dielectric electrode formed by bonding the sintered ceramic plates together, or a dielectric electrode formed through high temperature, co-firing.

Among the variety of bonding methods, the bonding method to form a stack through co-firing has many problems and it is thus preferable that the bonding method to form a stack use ceramic firing or glass fusion. The spacers 103 are prepared for application to this bonding method.

Each of the spacers 103 as a sintered ceramic body has the same shape as the stack portion of the plus and minus electrodes 101 and 102. The spacers 103 and the plus and minus electrodes 101 and 102 are bonded together to form a single stack 104. Vertical connection electrodes 111 with the two opposite polarities and a bonding surface 119 corresponding to an area other than the vertical connection electrodes 111 are formed on each of the two surfaces of each of the spacers 103, the two surfaces being bonded to the plus and minus electrodes 101 and 102.

Here, the vertical connection electrode 111 includes at least one conducting hole 117. The conducting hole 117 is filled with a conducting substance 118 (via-fill) or the inner surface of the conducting hole 117 is coated with a conducting substance 118 such as a conductive metal (through-hole) so that vertical connection electrodes 111 located at the opposite surfaces are electrically connected to each other.

The thermal and mechanical characteristics of the spacers 103 are similar to those of the plus and minus electrodes 101 and 102. Preferably, a material with high electrical insulation performance is selected as the material of the spacers 103. For example, the spacers 103 includes at least one appropriate material selected from the group consisting of aluminum oxide, zirconium oxide, silicon oxide, cordierite, mullite, titanium-barium-based oxide, magnesium-calcium-titanium-based oxide, barium-titanium-zinc-based oxide, silicon nitride, and aluminum nitride.

The stack is constructed such that each of the plus and minus electrodes 101 and 102 manufactured according to the above method (or a pair of symmetric sintered ceramic bodies which can form a plus or minus electrode 101 or 102) is electrically insulated from an adjacent plus or minus electrode 101 or 102 and each pair of adjacent plus or minus electrodes 101 or 102 are connected to each other.

A conductive electrode layer including vertical connection electrodes 111 at the stacked portion of each of the plus and minus electrodes 101 and 102 and the spacers 103 is in contact with a conductive electrode layer including vertical connection electrodes 111 of a portion to be bonded to it and it is preferable that a bonding surface 119 which is kept insulated from the edges of the spacer 103 and vertical connection electrodes 111 with opposite polarities be formed on the same surface.

The bonding for stacking may use a method such as co-firing, glass fusion, or ceramic firing. However, the co-firing method is undesirable for application to mass production since it is difficult to accurately control the intervals to form gas passages in the firing process and the degreasing process for removing a large amount of organic binder and solvent, which is left after being used in the green sheet and electrode coating step and the lamination step, is also very unstable.

On the other hand, according to the ceramic firing or glass fusion-based bonding method, it is easy to control the processes and it is also possible to construct a reliable insulation stack since the method uses sintered bodies so that it is possible to prevent deformation such as warping during the bonding process and also to easily perform degreasing, semi-firing, or the like in a process previous to the bonding process.

The ceramic firing-based bonding is more preferable. According to this method, it is possible to obtain a structure similar to that of the co-firing-based bonding method in terms of thermal balance and insulation reliability since the ceramic firing-based bonding method can bond the plus and minus electrodes 101 and 102 together in the manufacturing environment where the plus and minus electrodes 101 and 102 have been manufactured through co-firing or ceramic firing bonding, i.e., in the similar atmosphere and temperature environment.

During the bonding step, the plus and minus electrodes 101 and 102 and the spacer 103 are bonded together with a reinforcement column 120 being inserted into a column hole 121 formed in each of the plus and minus electrodes 101 and 102 and the spacer 103 in a direction perpendicular to the bonding layer. Insertion of the reinforcement column 120 has advantages in that it increases the strength of the stack of the plus and minus electrodes 101 and 102 and the spacer 103 and facilitates the alignment of the positions of the vertical connection electrodes 111 and the bonding surface 119 during the bonding process.

It is preferable that the position at which the reinforcement column 120 is inserted be based on how much the alignment is easy at the position, the insulation distance, and the like and that the reinforcement column 120 be inserted in contact with an inner or outer portion of the stack. Particularly, it is more preferable to insert the reinforcement column 120 at a position in contact with an outer portion of the plus and minus electrodes 101 and 102 than at a position in contact with an inner portion thereof since the outer portion provides a larger insertion tolerance so that it is easier to process the reinforcement column 120 and the column hole 121 and the stack alignment and assembly method is simpler, thereby increasing the productivity and manufacturing reliability.

The features of the present invention can be applied to any cross-sectional shape of the reinforcement column 120 such as that of a circular tube or bar or that of a polygonal tube or bar. It is preferable that material of the present invention be highly resistant to thermal shock, have a high strength, be bondable with an adhesive, and have an appropriate insulating capability. Examples of the present invention include alumina, silica, cordierite, zirconia, mullite, silicon nitride, and aluminum nitride.

FIGS. 8 to 12 illustrate applications of deformation preventing means to a plasma reactor according to the present invention to prevent damage and deformation of the plasma reactor due to thermal shock.

The structural form of the plasma reactor 100 suggested in the present invention is characterized by the capability to structurally absorb thermal shock.

Since a gas passage is formed between the opposing surfaces of each pair of plus and minus electrodes 101 and 102, the surface temperature of the plus and minus electrodes 101 and 102 may rapidly change due to rapid heat exchange with gas.

Under these structural environments, the plus and minus electrodes 101 and 102 may be deformed (expanded and contracted) according to their thermal expansion coefficients. The material of the plus and minus electrodes 101 and 102 will have a strong stress if the deformation is restricted and the plus and minus electrodes 101 and 102 may be cracked or broken if the stress is concentrated on a weak portion of the material.

Even if the deformation of the plus and minus electrodes 101 and 102 is unrestricted as the plus and minus electrodes 101 and 102 expand and contract as the temperature changes, a strong tensile or compressive stress may be applied in one direction to the entire surfaces of the electrodes if the change is great or rapid.

To prevent breakage of the material of the plus and minus electrodes 101 and 102 in such a situation, deformation preventing means 107 is formed on each of the plus and minus electrodes 101 and 102. The deformation preventing means 107 may be provided by forming a slit 122 or an arc 123 with an appropriate size and interval on an edge portion of the plus and minus electrodes 101 and 102 or by forming an appropriate hole 124 on an inner portion of the plus and minus electrodes 101 and 102.

The shape of the deformation preventing means 107 is characterized in that it disperses the stress in all directions over the entire surface of the electrode and minimizes breakage of the material even when a stress is applied to the electrode in a specific direction as the electrode surface undergoes deformation such as expansion or contraction as the temperature changes.

Another method to prevent the material breakage in environments with a rapid temperature change is to prevent concentration of the temperature change on one portion in the integrated plasma reactor 100.

That is, there is a great temperature difference between the area of the main electrode portion 115 of the dielectric electrode, which allows easy heat exchange so that it can easily come to equilibrium with the temperature of gas, and interfaces in the stack 104 that have a relatively high heat capacity so that they cannot easily come to equilibrium with the temperature of gas.

Thus, it is preferable to reduce the heat capacity of the stack 104 to reduce the temperature difference of such portions and to increase the surface of the stack 104 to facilitate heat exchange.

It is also preferable that the width 125 of a main electrode portion 115 be smaller than the width 126 of a vertical connection electrode 111 and a connection portion 127 between the main electrode portion 115 and the vertical connection electrode 111 is located within the gas passage or that spacers 103 having a shape extending into the gas passage and having a shape contracted into the stack 104 be alternately arranged.

FIG. 13 is a perspective view illustrating changes of the positions of external terminals on a plasma reactor according to the present invention.

In the present invention, the external terminals 108 and 109 may be located appropriately on one of the surfaces of the reactor body 105 excluding a surface included in an area where plasma is generated and the gas passage 106 is formed. The external terminals 108 and 109 may also be located on different surfaces or the same surface with a necessary insulation distance kept between the external terminals 108 and 109.

The external terminals 108 and 109 may be positioned opposite each other or at a right or specific angle with each other, depending on an ambient environment where the plasma reactor 100 fixed to the case 128 is placed. Thus, locating the two external terminals on one stack 104 does not restrict the power supply connection method while providing various solutions.

One method to secure a most reliable insulation distance from the case 128 or a power supply terminal of the opposite polarity is to locate the external terminals 108 and 109 on an area recessed inwardly from the surface of the reactor body 105 and to form a surface area of the stack 104 surrounding the external terminals 108 and 109 as a column projecting at an appropriate height. This method makes it possible to secure a sufficient insulation distance even in a limited range.

In the present invention, appropriate projections 110 are provided on surfaces of the plasma reactor 100 adjacent to a surface where the gas passages 106 and the plus and minus electrodes 101 and 102 inserted in the case 128 are formed, whereby the plasma reactor 100 can be more easily and simply fixed in the case 128 at a proper position.

FIG. 15 illustrates another example of the drawing-out of external terminals in a plasma reactor according to the present invention.

In order to separately connect the plus electrodes 101 which receive a high voltage and the minus electrodes 102 which are grounded to an external power supply, external terminals 108 and 109 are formed by constructing a vertical connection electrode 111 of each spacer 103 and each unit electrode located at a corresponding position so as to be connected to a surface area 129 at a position where a connection is made to the external power supply.

Each of the electrodes of the external terminals 108 and 109 may be located at a position inside the surface of the stack 104 and a surface area of the stack 104 adjacent to each of the electrodes of the external terminals 108 and 109 may be projected in order to secure a sufficient insulation distance from the case 128 in which the plasma reactor 100 is installed or from a metal terminal of the opposite polarity which supplies power to the electrodes of the external terminals 108 and 109.

This configuration reduces the limitation on the distance between the external terminals 108 and 109 of the opposite polarities that supply power and allows design to maintain a more reliable insulation distance.

In an environment where the plasma reactor 100 is repeatedly exposed to high temperature, a Ni plate layer may be formed on each of the external terminals 108 and 109 through electroplating or electroless plating using Ni—B or the like in order to increase the resistance to corrosion or oxidation of the surfaces of the external terminals 108 and 109 and an appropriately folded metal sheet may be brazed to each of the external terminals 108 and 109 using an oxidation-resistant brazing filler such as Ag. The metal sheet may use a Ni or Ni—Fe-based alloy.

In another method, in the stacking and bonding firing step, a metal sheet is inserted into the interface between a vertical connection electrode 111 of a plus or minus electrode 101 or 102 and a vertical connection electrode 111 of a spacer 103 at a portion where an inner terminal for vertical connection and each of the external terminals 108 and 109 are connected and stacking and firing are then performed to electrically connect them.

The material of the metal sheet has a melting point equal to or higher than the bonding temperature and can be combined with the metal layer used in the inner terminals through physicochemical reaction at the firing temperature and atmosphere for bonding. The material of the metal sheet can be selected from Ni, Mo, W, and Ni—Fe-based alloys.

As needed, the metal sheet connected to the inner terminals may be plated and brazed using an oxidation-resistant metal such as Ag as needed in order to increase the resistance to corrosion of the surface of the metal sheet. In the case where an external power supply plug is in contact with the terminal portion, the metal sheet may be folded to form external terminals 108 and 109 connected to the inner terminals and a corresponding external power supply wire may be connected to the metal sheet through a method such as brazing, welding, or pressing.

FIG. 16 is a cross-sectional view showing a first example of a free end limiting portion of a plasma reactor according to the present invention and FIG. 17 is a cross-sectional view showing a second example of the free end limiting portion of the plasma reactor according to the present invention.

The plus and minus electrodes 101 and 102 are manufactured such that one end of each of the plus and minus electrodes 101 and 102 is fixed to the stack 104 and the other end is free. When the plasma reactor 100 is exposed to a variety of vibrations, especially when the length of the plus and minus electrodes 101 and 102 placed in a plasma generation region is long, their free ends located opposite the stack 104 may undergo excessive deformation.

The free ends of the plus and minus electrodes 101 and 102 located opposite the stack 104 not only may freely expand and contract in the horizontal direction with respect to the stack 104 but also may move with excessive deformation in the vertical direction.

The uniformity of generation of plasma may be reduced and the dielectric electrodes may be broken if the plasma reactor 100 is brought into such situations. Accordingly, the plasma reactor 100 further includes a free end limiting portion 130 when it is necessary to limit deformation of the dielectric electrodes, particularly to limit the vertical deformation of the dielectric electrodes to prevent excessive vertical deformation of the stack 104.

The free end limiting portion 130 may be provided using a method of fixing or bonding a limiter 131 to the free end of each of the plus and minus electrodes 101 and 102. However, it is preferable that the plus and minus electrodes 101 and 102 not be fixed to each other in order to allow the plus and minus electrodes 101 and 102 to freely expand and contract in the horizontal direction of the stack 104.

One surface of the limiter 131 is fixed or bonded to the surface of the plus or minus electrode 101 or 102 and the other surface of the limiter 131 is kept separated from the surface of the plus or minus electrode 101 or 102.

The limiters 131 may be held by a holder 132 such as a rod or tube penetrating the free ends of the plus and minus electrodes 101 and 102. In this case, it doesn't matter if the limiters 131 is not bonded or fixed to any side of the plus and minus electrodes 101 and 102.

That is, the limiters 131 can limit deformation only in the vertical direction and is preferably bonded or fixed so as not to limit expansion and contraction in the horizontal direction.

There is no specific limitation on the shape of the limiter 131. The height of the limiter 131 is preferably 0.9-1.0 times the interval between the plus and minus electrodes 101 and 102 and the size of the limiter 131 will agree with the object of the present invention if the size is not so large as to impede the plasma generation region.

Although the limiters 131 may be located in any portions of the plus and minus electrodes 101 and 102 formed on one side of the stack 104, the limiters 131 are more preferably located at portions of the plus and minus electrodes 101 and 102 opposite the stack 104, i.e., portions of the plus and minus electrodes 101 and 102 where the greatest deformation is expected in the vertical direction. It is also preferable that the limiters 131 be constructed so as not to impede the flow of gas and uniform discharge for plasma generation.

Although not shown, a power supply to apply a voltage to the plasma generation electrodes may be provided in the plasma reactor 100 in this embodiment. The power supply may be any conventional one which can provide electricity capable of effectively generating plasma.

The plasma reactor 100 in this embodiment may not have any power supply and may receive current from an external power supply.

The current provided to the plasma generation electrodes used in this embodiment may be selected and determined appropriately according to the intensity of generated plasma. For example, when the plasma reactor is installed in an exhaust system of a car, it is preferable that the current provided to the plasma generation electrodes be a DC current with a voltage of 1 kV or higher, a pulse current with a peak voltage of 1 kV or higher and with the number of pulses per second being 100 or higher (i.e., a frequency of 100 Hz or higher), an AC (pulse) current with a peak voltage of 1 kV or higher and with a frequency of 100 Hz or higher, or a current obtained by overlapping or superposing any two of these currents. Constructing the plasma reactor 100 in this manner allows efficient generation of plasma.

The plasma reactor 100 manufactured in this manner and then inserted in the case 128 has advantages in that it can operate uniformly and reliably in an environment with serious gas temperature changes or an environment with gases including various corrosive gases, moisture, harmful particulate matter, and the like, and even in an environment with serious mechanical vibrations.

FIG. 18 is an exploded view of an electrode of a plasma reactor according to a second embodiment of the present invention, FIG. 19 is an assembled view of the electrode of the plasma reactor shown in FIG. 18, and FIG. 20 is a cross-sectional view of the plasma reactor when it is combined with a case.

Reference will now be made to a method for manufacturing a plasma reactor 100 including a stack 104 formed through glass fusion bonding, the stack 104 including external terminals 108 and 109 located at one side according to the second embodiment which shows the features of the present invention. Plus and minus electrodes 101 and 102 individually including external terminals 108 and 109 are manufactured to form the stack 104.

In one example, a relatively inexpensive electrode material such as W or Mo and an alumina-based ceramic with a high dielectric constant, a high insulation performance, and a high dielectric strength can be used to manufacture dielectric electrodes as plasma generation electrodes.

In one method, a dielectric electrode is manufactured by bonding together two ceramic green sheets with a conductive electrode layer inserted between them through co-firing. In another method, a conductive electrode layer and a bonding layer are formed between two sintered ceramic bodies and the two sintered ceramic bodies are bonded together through ceramic firing to manufacture a dielectric electrode with an embedded conductive electrode.

The two types of sintered ceramic bodies or ceramic green sheets are an electrode sheet 133 and a bonding sheet 134. The electrode sheet 133 includes a main electrode portion 115 and an external electrode 135 drawn out from the main electrode portion 115. The bonding sheet 134 has an external terminal hole 136 and a drawing-out hole 137.

The two bondable sheets, i.e., the electrode sheet 133 and the bonding sheet 134 are fired and bonded together or laminated and co-fired, with the external electrode 135 and the external terminal hole 136 matching and opposing each other, thereby manufacturing each of the plus and minus electrodes 101 and 102 including an embedded electrode.

The external electrode 135 of each of the plus and minus electrodes 101 and 102 is plated through Ni electroplating or electroless plating Ni—B electroless plating and a Ni wire is brazed to the external electrode 135 using an Ag brazing filler. Here, each of the plus and minus electrodes 101 and 102 is preferably manufactured with a Ni sheet 140 covering a terminal wire 138 in order to prevent oxidation of the external electrode 135 or the Ni wire.

The terminal wire 138 is bonded to the external electrode 135 by performing brazing after the terminal wire 138 to be brazed and an Ag brazing filler (in the form of a wire, sheet or paste) are placed on the external electrode 135 and are then covered with a Ni sheet 140.

It is possible to prevent oxidation of the external electrode 135 in an oxidation atmosphere or in a simple heat treatment process at a temperature below 1000° C. since the Ag layer fusion-bonded between the external electrode 135 and the terminal wire 138 brazed to each other is formed over the entire surface of the Ni sheet 140 and the outer surface of the terminal wire 138.

Specifically, the terminal wire 138 includes at least two Ni wires 141 and at least one Ag wire 142. During brazing, the Ag brazing filler 139 can be fusion-coated on the surface of the Ni wire 141 so that it is possible to prevent oxidation when bonding for stacking is performed through glass fusion and also to allow brazing or welding for connecting a power line.

An adhesive which allows glass fusion bonding is coated on each of the spacers 103 and the plus and minus electrodes 101 and 102, each including the external electrode 135 and the spacers 103 which have been subjected to the antioxidation treatment, and the plus and minus electrodes 101 and 102 and the spacers 103 are then stacked and bonded together to form a stack 104. Here, a reinforcement column 120 can be inserted into the column hole 121 to strengthen the vertical bonding/connection. After the plus and minus electrodes 101 and 102 and the spacers 103 are bonded together, terminal wires 138 connected to the external electrodes 135 of the plus and minus electrodes 101 and 102 are aligned at alignment grooves 143 of the same polarities as those of the terminal wires 138, respectively, and the stack 104 is then inserted into and fixed to a case 128.

In the plasma reactor 100, power can be supplied to each of the plus and minus electrodes 101 and 102 through a terminal wire 138 individually drawn out from the electrode and an insulator 144 can be inserted between the stack 104 and the case 128 to provide insulation between terminal wires 138 of the opposite polarities or between the case 128 and the terminal wires 138.

In this configuration of the plasma reactor 100, external terminals 108 and 109 to supply high voltage power for discharging are provided and insulated at one portion of the stack 104 and are then connected to the power supply with the opposite polarities. The reason why this configuration is possible despite thermal mismatch between the bonding layers of the stack 104 is because of the feature of the present invention that the power supply can be constructed so that it can be little or not affected by gas flow passages that undergo serious thermal changes. The configuration of the plasma reactor 100 is unique in that it is not broken even if there is a thermal mismatch between the bonding layers of the stack 104 due to the variety of bonding for stacking.

FIG. 21 is a front and side cross-sectional view of a plasma reactor according to a third embodiment of the present invention.

Tube-shaped plus and minus electrodes 101 and 102 are provided to construct a plasma reactor 100 in the third embodiment which is another embodiment showing the features of the present invention.

Specifically, tube-like electrodes 145, each including a conductive electrode layer or a metal rod, are constructed and arranged in one direction. Tube-like electrodes 145 with the opposite polarities are arranged in the same direction at appropriate intervals to allow the generation of plasma. External terminal wires of the tube-like electrodes 145 with the opposite polarities are coupled together at different heights of a stack 104 to provide an appropriate insulation distance between them.

FIG. 22 is a perspective view of a plasma reactor according to a fourth embodiment of the present invention.

A mixture of flat electrodes 146 and tube-like electrodes 145 is used as the plus and minus electrodes 101 and 102. External terminals of the electrodes with the opposite polarities are coupled together at different heights of a stack 104 to provide an appropriate insulation distance between them.

FIG. 23 shows a modification of the third and fourth embodiments according to the present invention. Plates 150 having vertical connection electrodes 111 are stacked to construct a reactor body 105. A plasma reactor 100 may be constructed by combining the reactor body 105 and the tube-like (145) or flat plus and minus electrodes 101 and 102 together after inserting, in a vertical direction with respect to the stack direction of the reactor body 105, the plus and minus electrodes 101 and 102 into tube holes 151 and electrode holes 152 formed in the reactor body 105.

The plasma reactor 100 constructed in this manner has not only the advantages of the plasma reactor 100 of the first and second embodiments but also advantages in that it increases the structural strength of the plus and minus electrodes 101 and 102 bonded or coupled to the reactor body 105 and permits effective electric conduction between the plus and minus electrodes 101 and 102 and the vertical connection electrodes 111 and it is also easy to perform wiring and to control insulation from the opposite polarity.

In the present invention, the method of manufacturing a multi-cell plasma reactor 100 by arranging plasma generation electrodes at one side can be performed with various types of electrodes. The plasma reactor of the present invention can be applied to various use environments of the reactor to generate uniform plasma with a high resistance to thermal shock and a high insulation performance.

INDUSTRIAL APPLICABILITY

The plasma reactor of the present invention is part of a system that purifies gases (for example, exhaust gases of vehicle engines or exhaust gases of various high-temperature incinerators) in various environments such as an environment with very serious changes in the temperature of gas or an environment which may degrade insulation properties since the environment includes corrosive gases, harmful particulate matter, a large amount of moisture, or the like. The plasma reactor of the present invention can also be used for various applied products such as an ozone generator that forms high-concentration ozone water.

The invention claimed is:

1. A plasma reactor comprising:
a stack (104) constructed by sequentially stacking plus electrodes (101) and minus electrodes (102) and spacers (103), each of the plus and minus electrodes (101, 102) including a conductive electrode, which includes a main electrode portion (115) and is insulated from neighboring plus and minus electrodes (101, 102) of opposite polarity, a vertical connection electrode (111) for connecting each of the plus and minus electrodes (101, 102) to neighboring plus and minus electrodes (101, 102) of same polarity;
a reactor body (105) provided at only a single lateral side of the stack (104) to hold the stack (104) from the single lateral side among multiple lateral sides of the stack;
deformation preventing means (107) disposed at each of said plus and minus electrodes (101, 102) to disperse stress of the plus and minus electrodes (101, 102) and relieve a local thermal stress buildup thermal expansion and contraction; and
a first external terminal (108) provided on the reactor body (105) for electrically connecting the plus electrodes (101), and a second external terminal (109) provided on the reactor body (105) for electrically connecting the minus electrodes (102);
wherein the plus electrodes (101) and the minus electrodes (102) are arranged alternately with spacers (103) therebetween to define passages (106) through which gas is allowed to pass, and a projection (110) is formed on a surface of the reactor body (105) in a direction perpendicular to a stack direction of the stack (104) for fixing the plasma reactor (100) to a case.

2. The plasma reactor according to claim 1, wherein the plus electrodes (101) are connected to each other through the vertical connection electrodes (111), and the minus electrodes (102) are connected to each other through the vertical connection electrodes (111), and the plus and minus electrodes are then connected to the external terminals (108, 109) provided on the reactor body (105) holding the stack (104), and wherein the external terminals (108, 109) are connected to a pulse or AC power supply to allow plasma to be generated at conductive electrode portions included in opposing plus and minus electrodes (101, 102) with opposite polarities.

3. The plasma reactor according to claim 1, wherein each of the plus and minus electrodes (101, 102) includes: the main electrode portion (115), corresponding to a region to generate plasma, formed on each of the plus and minus electrode (101) and (102); two vertical connection electrodes (111) provided on a stack portion of the plus or minus electrode (101) and (102); and a horizontal connection electrode 116 that connects the main electrode portion (115) to one of the two vertical connection electrodes (111).

4. The plasma reactor according to claim 1, wherein the plus and minus electrodes (101, 102), each including the main electrode portion (115) and the vertical connection electrode (111), are constructed by preparing an unfired green sheet with the main electrode portion (115) formed by coating a conductive metal layer on the unfired green sheet, preparing another green sheet with the vertical connection electrode (111) formed by coating a conductive metal layer on the green sheet, and then laminating and co-firing the two green sheets.

5. The plasma reactor according to claim 1, wherein each of the spacers (103) has the same shape as a stack portion of each of the plus and minus electrodes (101, 102) so that the spacers (103) and the plus and minus electrodes (101, 102) are bonded together to form the stack (104) and vertical connection electrodes (111) with two opposite polarities and a bonding surface (119) corresponding to an area other than the vertical connection electrodes (111) are formed on two surfaces of each of the spacers (103), the two surfaces being bonded to the plus and minus electrodes (101, 102).

6. The plasma reactor according to claim 1, wherein the deformation preventing means (107) includes a slit 122 or an arc (123) formed on an edge portion of the plus and minus electrodes (101, 102).

7. The plasma reactor according to claim 1, wherein the deformation preventing means (107) includes a hole (124) formed on an inner portion of the plus and minus electrodes (101, 102).

8. The plasma reactor according to claim 1, wherein the deformation preventing means (107) is constructed such that spacers (103) having a shape extending into a passage (106) through which gas passes and having a shape contracted into the stack (104) are alternately arranged.

9. The plasma reactor according to claim 1, wherein a width (125) of the main electrode portion (115) of each of the plus and minus electrodes (101, 102) is smaller than a width (126) of the vertical connection electrode (111) and a connection portion (127) between the main electrode portion (115) and the vertical connection electrode (111) is located within the passage (106) so as to reduce heat capacity of the stack (104) and to facilitate heat exchange.

10. The plasma reactor according to claim 1, wherein the external terminals (108, 109) are located in an area of the reactor body (105) other than where plasma is generated and the gas passage (106) is formed, with a necessary insulation distance being kept between the external terminals (108, 109).

11. The plasma reactor according to claim 1, wherein the plus and minus electrodes (101, 102) further include a free end limiting portion (130) which can limit deformation of the dielectric electrodes to prevent excessive vertical deformation of the stack (104).

12. The plasma reactor according to claim 1, wherein each of the plus and minus electrodes (101, 102) includes: the main electrode portion (115); an electrode sheet (133) including an external electrode (135) drawn out from the main electrode portion (115); and a bonding sheet (134) having an external terminal hole (136) and a drawing-out hole (137), wherein the electrode sheet (133) and the bonding sheet (134) are bonded together so that the external electrode (135) and the external terminal hole (136) match and oppose each other, a terminal wire (138) is connected to the external electrode (135), and the terminal wire (138) is covered with a nickel sheet (140) to prevent oxidation.

13. The plasma reactor according to claim 1, wherein each of the plus and minus electrodes (101, 102) and the spacers (103) has a column hole (121) formed at a bonding portion of each of the plus and minus electrodes (101, 102) and the spacers (103) so that a reinforcement column (120) can be inserted into the column hole (121) to increase strength in a direction perpendicular to a bonding layer and to facilitate alignment of positions of a vertical connection electrode (111) and a bonding surface (119).

14. The plasma reactor according to claim 1, wherein the plus and minus electrodes (101, 102) include tube-like electrodes (145), each including a conductive electrode layer or a metal rod.

15. The plasma reactor according to claim 14, wherein the reactor body (105) constructed by stacking plates (150) having vertical connection electrodes (111) and the tube-like electrode (145) or flat plus and minus electrodes (101, 102) are combined together after the plus and minus electrodes (101, 102) are inserted in a vertical direction with respect to a stack direction of the reactor body (105) into tube holes (151) and electrode holes (152) formed in the reactor body (105).

16. The plasma reactor according to claim 1, wherein the vertical connection electrode (111) has one or more conducting holes (117) that penetrate the plus and minus electrodes (101, 102) vertically with respect to a surface of the plus and minus electrodes (101, 102) and a conducting substance (118) is filled in the conducting holes (117) or is coated on inner surfaces of the conducting holes (117) to allow electrical connection between electrodes of two surfaces including the conducting holes (117).

17. The plasma reactor according to claim 3, wherein the vertical connection electrode (111) that is not connected to the main electrode portion (115) is electrically connected vertically to a neighboring plus or minus electrode (101) or (102) with an opposite polarity to achieve a stacked array of plus and minus electrodes (101, 102) with two opposite polarities insulated from each other.

18. The plasma reactor according to claim 11, wherein the free end limiting portion (130) is provided by fixing or bonding a limiter (131) to a free end of each of the plus and minus electrodes (101, 102).

19. The plasma reactor according to claim 18, wherein one surface of the limiter (131) is fixed or bonded to a surface of a corresponding plus or minus electrode (101) or (102) and the other surface of the limiter (131) is kept separated from any surface of the plus and minus electrodes (101, 102) to allow the plus and minus electrodes (101, 102) to freely expand and contract in a horizontal direction of the stack (104).

20. The plasma reactor according to claim 18, wherein the limiter (131) is bonded or fixed to a holder (132) penetrating the free ends of the plus and minus electrodes (101, 102).

21. The plasma reactor according to claim 18, wherein the limiter (131) has a height that is 0.9-1.0 times an interval between the plus and minus electrodes (101, 102) and the limiter (131) has a size that does not impede a plasma generation region.

22. The plasma reactor according to claim 18, wherein the limiter (131) is located at a position of the plus and minus electrodes (101, 102) where greatest deformation is expected in a vertical direction and where the limiter (131) does not impede gas flow and uniform discharge for plasma generation.

* * * * *